United States Patent
Yi et al.

(10) Patent No.: US 10,158,469 B2
(45) Date of Patent: Dec. 18, 2018

(54) METHOD AND APPARATUS FOR RECEIVING CONTROL CHANNEL BY CONFIGURING USER-CENTRIC VIRTUAL CELL IN WIRELESS COMMUNICATION SYSTEM

(71) Applicant: LG ELECTRONICS INC., Seoul (KR)

(72) Inventors: Yunjung Yi, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 23 days.

(21) Appl. No.: 15/318,908

(22) PCT Filed: Jun. 15, 2015

(86) PCT No.: PCT/KR2015/006001
§ 371 (c)(1),
(2) Date: Dec. 14, 2016

(87) PCT Pub. No.: WO2015/194810
PCT Pub. Date: Dec. 23, 2015

(65) Prior Publication Data
US 2017/0117993 A1    Apr. 27, 2017

Related U.S. Application Data

(60) Provisional application No. 62/012,413, filed on Jun. 15, 2014.

(51) Int. Cl.
*H04L 5/00* (2006.01)
*H04B 7/26* (2006.01)
(Continued)

(52) U.S. Cl.
CPC ............... *H04L 5/005* (2013.01); *H04B 7/26* (2013.01); *H04L 5/0007* (2013.01);
(Continued)

(58) Field of Classification Search
CPC ... H04L 5/005; H04L 5/00072; H04W 72/042
(Continued)

(56) References Cited

U.S. PATENT DOCUMENTS

2012/0327841 A1* 12/2012 Lee .................. H04W 48/08
370/315
2013/0070719 A1   3/2013 Xu et al.
(Continued)

FOREIGN PATENT DOCUMENTS

EP          2464187 A2      6/2012
KR    10-2012-0061881 A    6/2012
(Continued)

OTHER PUBLICATIONS

Taori et al., "Cloud Cell: Paving the way for Edgeless Networks," 2013 IEEE Global Communications Conference (Globecom), IEEE, Dec. 9, 2013, XP032604738, pp. 3546-03552.

*Primary Examiner* — Mohammad S Adhami
(74) *Attorney, Agent, or Firm* — Birch, Stewart, Kolasch & Birch, LLP

(57) ABSTRACT

Provided are a method and an apparatus for receiving a control channel in a wireless communication system. A user equipment (UE) receives, in the course of configuring a user-centric virtual cell or a cooperation-based cell cluster and performing handover, a physical downlink control channel (PDCCH) and a cell-specific reference signal (CRS) from at least one of an anchor cell or a supporting neighbor cell, and receives data from at least one of the anchor cell or the supporting neighbor cell on the basis of the received PDCCH and CRS.

6 Claims, 24 Drawing Sheets

(51) Int. Cl.
*H04W 72/04* (2009.01)
*H04W 36/00* (2009.01)
H04W 36/04 (2009.01)
H04W 88/08 (2009.01)

(52) U.S. Cl.
CPC ..... *H04W 36/0055* (2013.01); *H04W 72/042* (2013.01); *H04W 36/04* (2013.01); *H04W 88/085* (2013.01)

(58) Field of Classification Search
USPC ........................................................ 370/329
See application file for complete search history.

(56) References Cited

U.S. PATENT DOCUMENTS

| 2014/0098751 A1 | 4/2014 | Luo et al. |
| 2014/0105050 A1 | 4/2014 | Kang et al. |
| 2014/0133429 A1 | 5/2014 | Chun et al. |

FOREIGN PATENT DOCUMENTS

| KR | 10-2013-0040933 A | 4/2013 |
| KR | 10-2014-0018975 A | 2/2014 |

\* cited by examiner

METHOD AND APPARATUS FOR RECEIVING CONTROL CHANNEL BY CONFIGURING USER-CENTRIC VIRTUAL CELL IN WIRELESS COMMUNICATION SYSTEM

CROSS REFERENCE TO RELATED APPLICATIONS

This application is the National Phase of PCT International Application No. PCT/KR2015/006001, filed on Jun. 15, 2015, which claims priority under 35 U.S.C. 119(e) to U.S. Provisional Application No. 62/012,413, filed on Jun. 15, 2014, all of which are hereby expressly incorporated by reference into the present application.

BACKGROUND OF THE INVENTION

Field of the Invention

The present invention relates to wireless communication and, more particularly, to a method and apparatus for receiving a control channel by configuring a user-centric virtual cell in a wireless communication system.

Related Art

Since a user equipment (UE) as a representative mobile device has mobility, the UE may experience deterioration in the quality of a service currently provided and may discover a cell providing better services. Thus, the UE may move to a new cell, which is called a handover of the UE.

A microcell, femtocell, and picocell having small service coverage may be installed in a specific location within the coverage of a macrocell having wide coverage. Such cells may be referred to as small cells.

A heterogeneous network (HetNet) refers to a network in which diverse types of cells overlap to be managed simultaneously in the same area. As it becomes difficult to meet a growing demand for data from UEs with only one existing macrocell in recent times, an HeNet topology and small-cell dense structure are suggested to serve a local area using a low-output microcell, femtocell, picocell, radio repeater, or the like, thereby increasing overall network capacity and improving energy efficiency. With small and dense cells, an inter-cell cooperative transmission technique and a technique for processing a frequent handover of a UE with mobility receive attention.

SUMMARY OF THE INVENTION

The present invention provides a method and apparatus for receiving a control channel by configuring a user-centric virtual cell in a wireless communication system. The present invention provides a method and apparatus for receiving a physical downlink control channel (PDCCH) and a cell-specific reference signal (CRS) from at least one of an anchor cell or a supporting neighbor cell.

In an aspect, a method for receiving a control channel by user equipment (UE) in a wireless communication system is provided. The method includes receiving a physical downlink control channel (PDCCH) and a cell-specific reference-signal (CRS) from at least one of an anchor cell or a supporting neighbor cell, and receiving data from at least one of the anchor cell or the supporting neighbor cell on the basis of the received PDCCH and CRS.

In another aspect, a user equipment (UE) is provided. The UE includes a memory, a transceiver, and a processor, connected to the memory and the transceiver, that controls the transceiver to receive a physical downlink control channel (PDCCH) and a cell-specific reference-signal (CRS) from at least one of an anchor cell or a supporting neighbor cell, and controls the transceiver to receive data from at least one of the anchor cell or the supporting neighbor cell on the basis of the received PDCCH and CRS.

A UE may efficiently receive a control channel in a handover procedure using a cooperation-based cell cluster.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
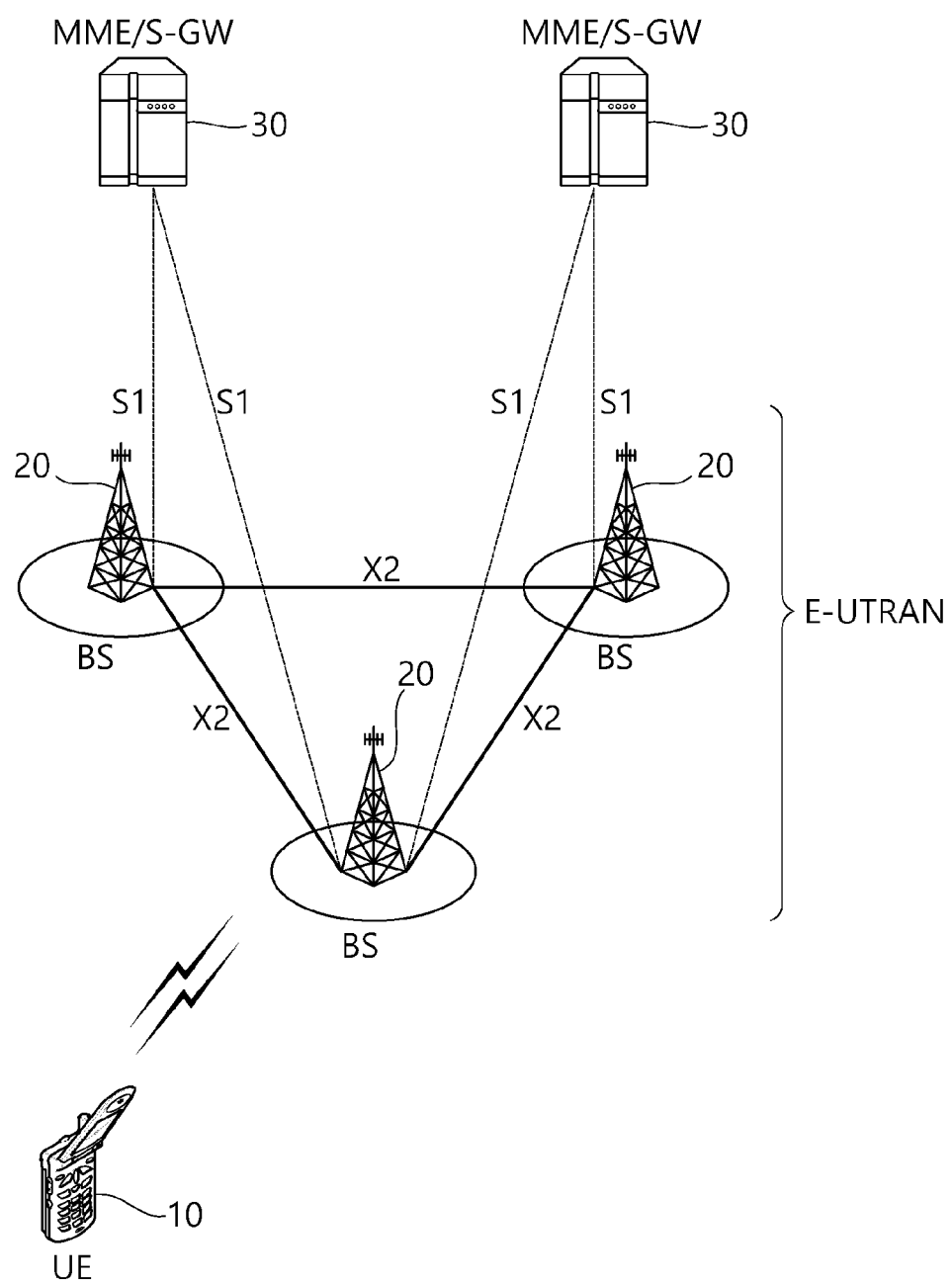
FIG. 1 illustrates a wireless communication system to which the present invention is applied.

FIG. 1 illustrates a wireless communication system to which the present invention is applied. The wireless communication system may be called an evolved-UMTS terrestrial radio access network (E-UTRAN), or a LTE/LTE-A system.

The E-UTRAN includes a base station (BS) 20 which provides a control plane and a user plane to user equipment (UE) 10. The UE 10 may be fixed or have mobility, and may be referred to as other terms such as a mobile station (MS), a user terminal (UT), user, a subscriber station (SS), a mobile terminal (MT), and a wireless device. The BS 20 generally represents a fixed station that communicates with the UE 10 and may be referred to as other terms such as a cell, an evolved-NodeB (eNB), a base transceiver system (BTS), and an access point.

The BSs 20 may be connected to each other through an X2 interface. The BS 20 is connected with an evolved packet core (EPC) 30 through an S1 interface, and more particularly, connected with a mobility management entity (MME) through an S1-MME and a serving gateway (S-GW) through an S1-U.

The EPC 30 is constituted by the MME, the S-GW, and a packet data network-gateway (P-GW). The MME has access information of the UE or information regarding capacity of the UE, and the information is frequently used in mobility management of the UE. The S-GW is a gateway having the E-UTRAN as an end point, and the P-GW is a gateway having the PDN as an end point.

Layers of a radio interface protocol between the UE and the network may be divided into a first layer L1, a second layer L2, and a third layer L3 based on three lower layers of an open system interconnection (OSI) standard model which is widely known in the communication system.

Figure 2:
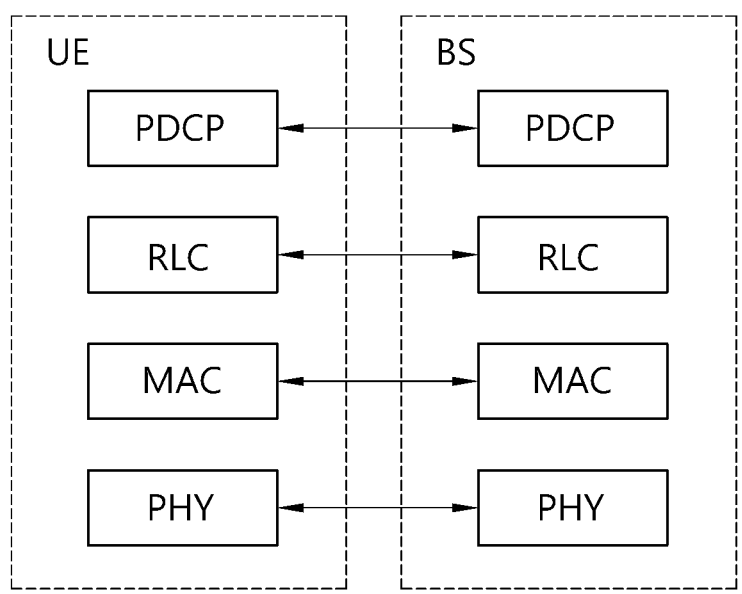
FIG. 2 is a block diagram illustrating a radio protocol architecture for a user plane.

FIG. 2 is a block diagram illustrating a radio protocol architecture for a user plane.

Figure 3:
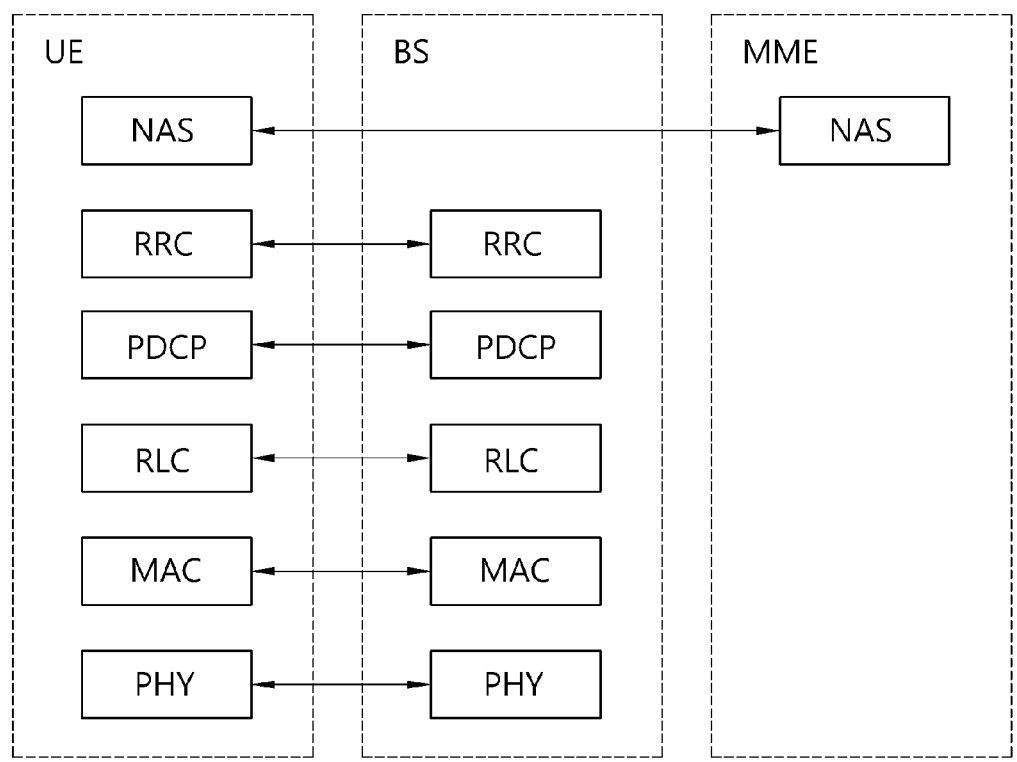
FIG. 3 is a block diagram illustrating a radio protocol architecture for a control plane.

FIG. 3 is a block diagram illustrating a radio protocol architecture for a control plane.

The user plane is a protocol stack for user data transmission, and the control plane is a protocol stack for control signal transmission.

Referring to FIGS. 2 and 3, a physical (PHY) layer provides an information transfer service to an upper layer by using a physical channel. The PHY layer is connected with a medium access control (MAC) layer which is the upper layer through a transport channel. Data move between the MAC layer and the PHY layer through the transport channel. The transport channel is classified according to how the data is transmitted through a radio interface with any characteristic.

The data move between different PHY layers, that is, the PHY layers of the transmitter and the receiver through the physical channel. The physical channel may be modulated by an orthogonal frequency division multiplexing (OFDM) scheme, and use a time and a frequency as the radio resource.

A function of the MAC layer includes mapping between a logical channel and a transport channel and multiplexing/demultiplexing to a transport block provided to the physical channel on the transport channel of a MAC service data unit (SDU) which belongs to the logical channel. The MAC layer provides a service to a radio link control (RLC) layer through the logical channel.

A function of the RLC layer includes concatenation, segmentation, and reassembly of the RLC SDU. In order to secure various quality of services (QoS) required by a radio bearer (RB), an RLC layer provides three operation modes of a transparent mode (TM), an unacknowledged mode (UM), and an acknowledged mode (AM). The AM RLC provides an error correction through an automatic repeat request (ARQ).

A function of a packet data convergence protocol (PDCP) layer in the user plane includes transfer, header compression, and ciphering of the user data. A function of the PDCP layer in the control plane includes transfer and ciphering/integrity protection of control plane data.

The radio resource control (RRC) layer is defined only in the control plane. The RRC layer performs a role of controlling radio resources between the UE and the network. For this, the RRC layer exchanges a RRC message between the UE and the eNB. The RRC layer is related with configuration, re-configuration, and release of the RBs to serve to control the logical channel, the transport channel, and the physical channels. The RB means a logic path provided by a first layer (PHY layer) and a second layer (MAC layer, RLC layer, or PDCP layer) in order to transfer the data between the UE and the network.

The configuration of the RB means a process of defining characteristics of the radio protocol layer and the channel in order to provide a specific service and configuring each detailed parameter and operation method. The RB may be divided into a signaling RB (SRB) and a data RB (DRB) again. The SRB is used as a path for transmitting an RRC message in the control plane, and the DRB is used as a path for transporting user data in the user plane.

When RRC connection is established between the RRC layer of the UE and the RRC layer of the E-UTRAN, the UE is in an RRC connected state, and if not, the UE is in an RRC idle state.

A downlink transport channel for transporting the data to the UE from the network includes a broadcast channel (BCH) for transporting system information and a downlink shared channel (DL-SCH) for transporting user traffic or a control message. The traffic or the control message of a downlink multicast or broadcast service may be transported through the DL-SCH, or may be transported through a separate downlink multicast channel (MCH). Meanwhile, an uplink transport channel for transporting the data from the UE to the network includes a random access channel (RACH) for transporting an initial control message and an uplink shared channel (UL-SCH) for transporting the user traffic or the control message in addition to the RACH.

A logical channel which is above the transport channel and mapped in the transport channel includes a broadcast control channel (BCCH), a paging control channel (PCCH), a common control channel (CCCH), a multicast control channel (MCCH), a multicast traffic channel (MTCH), and the like.

The physical channel is constituted by several OFDM symbols in a time domain and several sub-carriers in a frequency domain. One sub-frame is constituted by a plurality of OFDM symbols in the time domain. The RB as a resource allocation unit is constituted by a plurality of OFDM symbols and a plurality of sub-carriers. Further, each sub-frame may use specific sub-carriers of specific OFDM symbols (for example, first OFDM symbols) of the corresponding sub-frame for the physical downlink control channel (PDCCH), that is, a L1/L2 control channel. A transmission time interval (TTI) is a unit time of sub-frame transmission.

Hereinafter, an RRC state of the UE and an RRC connection method will be described.

The RRC state means whether the RRC layer of the UE is logical-connected with the RRC layer of the E-UTRAN or not, and a case where the RRC layer of the UE is connected with the RRC layer of the E-UTRAN is called a RRC connection state, and a case where the RRC layer of the UE is not connected with the RRC layer of the E-UTRAN is called an RRC idle state. Since the RRC connection exists in the UE in the RRC connection state, the E-UTRAN may determine the existence of the corresponding UE in a cell unit, and as a result, the UE may be efficiently controlled. On the other hand, the UE in the RRC idle state may not be determined by the E-UTRAN, and a core network (CN) is managed by a tracking area unit which is a larger area unit than the cell. That is, in the UE in the RRC idle state, only the existence is determined by a large area unit, and the UE needs to move in the RRC connection state in order to receive a general mobile communication service such as voice or data.

When the user first turns on the power of the UE, the UE first searches a proper cell and then stays in the RRC idle state in the corresponding cell. The UE in the RRC idle state establishes the RRC connection with the E-UTRAN through an RRC connection procedure only when the RRC connection is required, and is transited into the RRC connection state. There are several cases where the UE in the RRC idle state requires the RRC connection, and for example, uplink data transmission is required due to reasons such as user's call attempt, or a response message to a case where a paging message is received from the E-UTRAN is transmitted.

A non-access stratum (NAS) layer positioned above the RRC layer performs functions such as a session management and a mobility management.

In the NAS layer, in order to manage mobility of the UE, two states of EPS mobility management-REGISTERED (EMM-REGISTER) and EMM-DEREGISTERED are defined, and the two states are applied to the UE and the MME. The initial UE is in the EMM-DEREGISTERED state, and the UE performs a procedure of registering the UE in the corresponding network through an initial attaching procedure so as to be connected to the network. When the attaching procedure is successfully performed, the UE and the MME are in the EMM-REGISTERED state.

In order to manage signaling connection between the UE and the EPS, two states of an EPS connection management (ECM)-IDLE state and an ECM-CONNECTED state, and the two states are applied to the UE and the MME. When the UE in the ECM-IDLE state is RRC-connected with the E-UTRAN, the corresponding UE becomes in the ECM-CONNECTED state. When the MME in the ECM-IDLE state is S1-connected with the E-UTRAN, the corresponding MME becomes in the ECM-CONNECTED state. When the UE is in the ECM-IDLE state, the E-UTRAN does not have context information of the UE. Accordingly, the UE in the ECM-IDLE state performs a procedure related with the mobility based on the UE such as cell selection or cell reselection without receiving a command of the network. On the contrary, when the UE is in the ECM-CONNECTED state, the mobility of the UE is managed by the command of the network. When a position of the UE in the ECM-IDLE state is different from a position which is known to the network, the UE notifies the corresponding position of the UE to the network through a tracking area updating procedure.

Hereinafter, a method for performing a handover by configuring a user-centric virtual cell and/or a cooperation-based cell cluster according to an embodiment of the present invention will be described.

Figure 4:
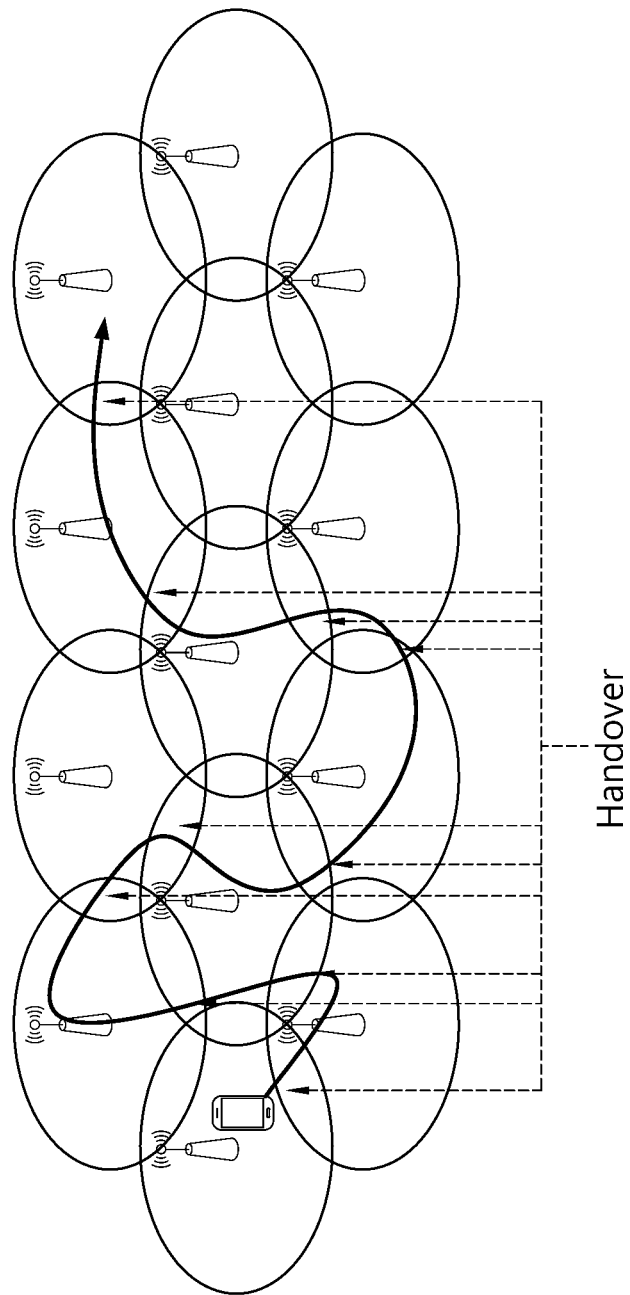
FIG. 4 illustrates a handover problem occurring when UE having mobility moves in a small cell congestion environment.

FIG. 4 illustrates a handover problem occurring when UE having mobility moves in a small cell congestion environment. In recent years, as a data required amount of UE is gradually increased, it is difficult to be satisfied by only an existing one macro cell. Accordingly, a scheme for serving a small zone using a macro cell, a femtocell, and a picocell of low output has been introduced. When the UE continuously moves to the above small cell congestion environment, a handover occurs frequently due to a current handover procedure. Referring to FIG. 4, total 10 handovers may occur due to moving of the UE. Each time the UE performs the handover, the performance is degraded. As a result, the whole QoS of the UE may be significantly reduced due to the frequent handover. An amount of a handover signaling overhead to a core network may be excessively increased. The above trend causes a big problem in a future communication network environment including a plurality of small cells and is considered as one problem to be essentially solved.

Accordingly, in order to solve the above problem, a handover method using a cooperation-based cell cluster according to an embodiment of the present invention may be suggested. According to an embodiment of the present invention, if the UE moves from a current served anchor cell to a service zone of a neighbor cell, two or more base stations serves the UE through cooperation transmission, and the handover to a neighbor cell does not occur by maintaining an anchor cell of the UE as it is. Next, if the UE moves to a service zone of a different cell not neighboring a current served anchor cell, that is, an anchor candidate cell through a neighbor cell, the UE performs the handover for the first time. Accordingly, the total number of handovers may be significantly reduced.

According to an embodiment of the present invention, a supporting neighbor cell cooperating with the anchor cell may be previously configured as the cooperation-based cell cluster. By configuring the cooperation-based cell cluster, a resource is integrally and efficiently managed. The cooperation communication may be easily performed and prepared by performing cooperation in a preset cooperation-based cell cluster in order to perform actual cooperation communication. The cooperation-based cell cluster may be expressed or configured by a cooperation-based cell cluster table.

Figure 5:
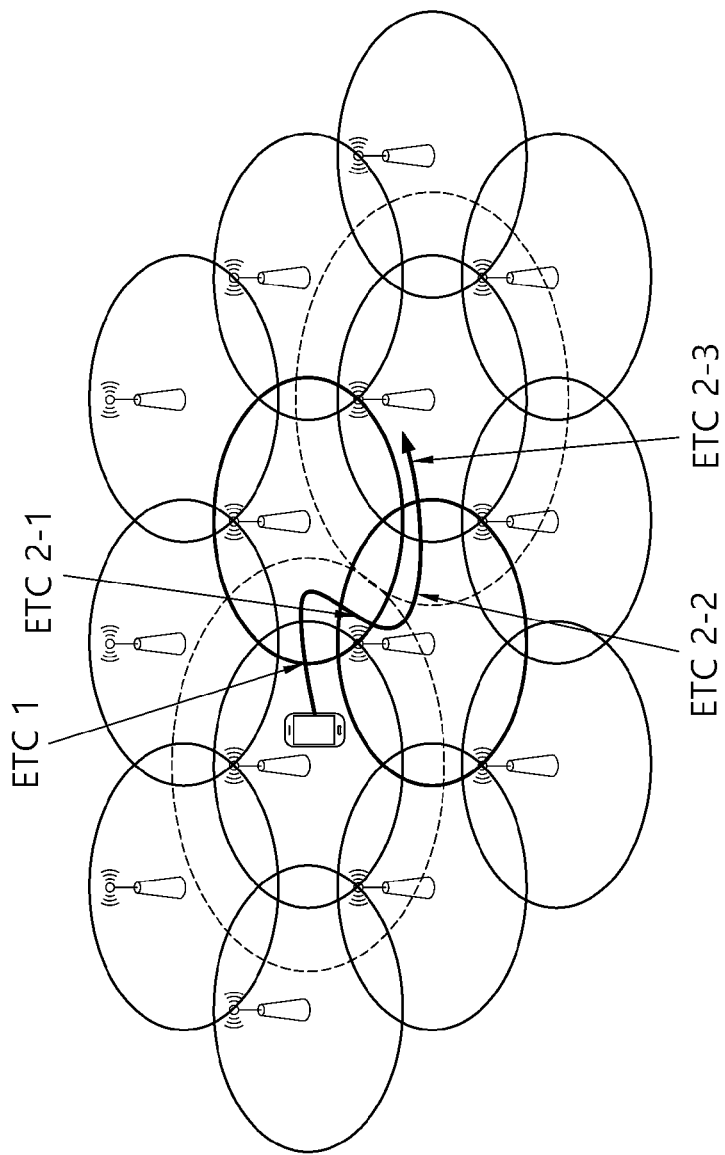
FIG. 5 illustrates an example of a handover method using a cooperation-based cell cluster according to an embodiment of the present invention.

FIG. 5 illustrates an example of a handover method using a cooperation-based cell cluster according to an embodiment of the present invention. It is assumed in FIG. 5 that the UE moves in the direction of an arrow.

First, the UE is served from an anchor cell, and includes a neighbor cell having the greatest reference signal received power (RSRP) among neighbor cells of the anchor cell in the cooperation-based cell cluster as a candidate supporting neighbor cell performing cooperation communication later. In this case, one anchor cell and one candidate supporting neighbor cell may configure the cooperation-based cell cluster, and one anchor cell and a plurality candidate supporting neighbor cells may configure the cooperation-based cell cluster. That is, the number of the candidate supporting neighbor cells included in the cooperation-based cell cluster may be changed as necessary. In this case, it is assumed that the number of the candidate supporting neighbor cell included in the cooperation-based cell is 1. Further, a state where the UE is served from one anchor cell and only candidate supporting neighbor cells are included in the cooperation-based cell cluster may be defined as a level 1 state. Further, an RSRP is assumed for the purpose of convenience. However, the present invention is limited thereto. The RSRP may be replaced with a received signal strength indicator (RSSI) or a reference signal received quality (RSRQ).

Next, if the UE moves and an RSRP of an anchor cell is not greater by a first cooperation threshold T1 than an RSRP of a cell being a candidate supporting neighbor cell, that is, if an event triggering condition (ETC) 1 is satisfied, the anchor cell and the candidate supporting neighbor cell perform cooperation communication. The candidate supporting neighbor cell becomes a supporting neighbor cell by performing the cooperation communication. In this case, although the cooperation communication is performed, the anchor cell is not changed so that the handover does not occur and the cooperation-based cell cluster is also maintained without change. As described above, a state of performing cooperation communication by including the anchor cell and the supporting neighbor cell in the cooperation-based cell cluster by the UE may be defined as a level 2 state.

Next, if the UE again moves and an RSRP of a different neighbor cell neighboring a current anchor cell is greater by a substitute threshold T3 than an RSRP of a current supporting neighbor cell, that is, if an ETC 2-1 is satisfied, the supporting neighbor cell is substituted and the anchor cell and a new supporting neighbor cell may perform cooperation communication.

Next, if the UE further moves and an RSRP of a cell (candidate anchor cell) not neighboring a current anchor cell is greater by a handover threshold T2 than an RSRP of a current anchor cell, that is, if an ETC 2-2 is satisfied, the handover is performed and the anchor cell is substituted by a handover cell. In this case, the supporting neighbor cell is maintained as it is, and a new anchor cell and the supporting neighbor cell may perform cooperation communication immediately after the handover is performed. Accordingly, the level 2 state is still maintained.

Next, if the UE fully moves to a zone of the new anchor cell and an RSRP of the new anchor cell is greater by a second cooperation threshold T4 than an RSRP of a supporting neighbor cell, that is, if an ETC 2-3 is satisfied, cooperation communication between the new anchor cell and the supporting neighbor cell stops and the state is retuned to a level 1 state and the above procedure is repeated.

Figure 6:
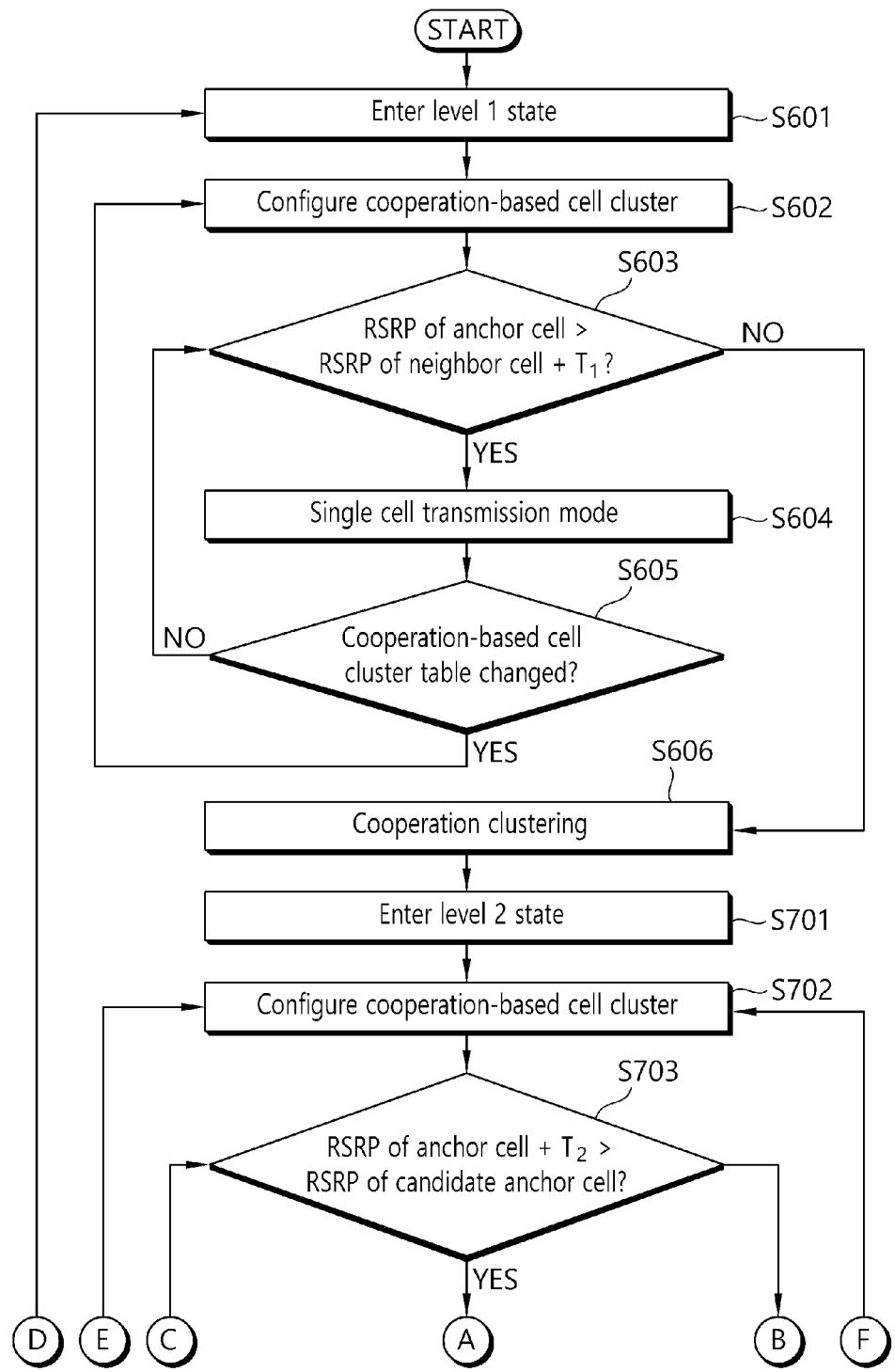
FIG. 6 and FIG. 7 illustrate an example of a handover method using a cooperation-based cell cluster according to an embodiment of the present invention.
Figure 7:
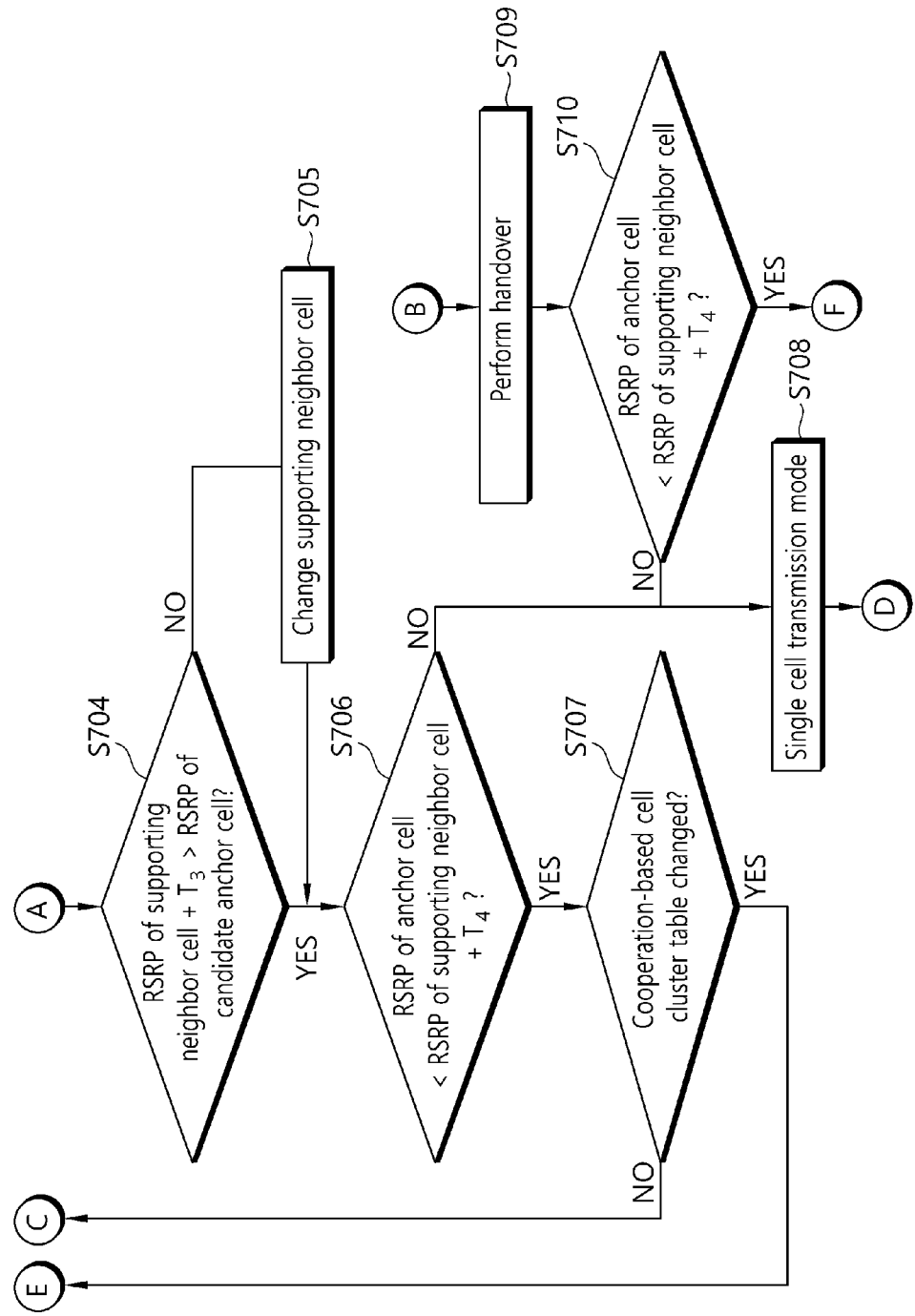

FIG. 6 and FIG. 7 illustrate an example of a handover method using a cooperation-based cell cluster according to an embodiment of the present invention. As shown in FIG. 6 and FIG. 7, a suggested scheme may be implemented by separately defining operations of a base station and UE in a level 1 state and a level 2 state. As described above, a threshold for cooperation cell selection and release in a level 1 state is defined as first cooperation threshold T1, a threshold for cooperation cell selection and release in a level 2 state is defined as second cooperation threshold T4, a threshold for handover selection and release is defined as handover threshold T2, a threshold for substituting a supporting neighbor cell is defined as substitute threshold T3, and T1/T2/T3/T4 may have different values.

First, in order to determine whether to perform cooperation communication with a neighbor cell in a level 1 state (S601), the UE may collect RSRP information of the neighbor cell and a base station may configure a cooperation-based cell cluster using an RSRP (S602). The base station may compare a sum of an RSRP of the neighbor cell and the first cooperation threshold with an RSRP of an anchor cell to determine whether to perform cooperation communication with the neighbor cell (S603). When the RSRP of an anchor cell exceeds the sum of an RSRP of the neighbor cell and the first cooperation threshold T1, the anchor cell is operated in a single cell transmission mode (S604). The base station determines whether the cooperation-based cell cluster is changed (S605). When the cooperation-based cell cluster is changed, the base station reconfigures the cooperation-based cell cluster (S602). When the cooperation-based cell cluster is not changed, the base station may determine whether to perform the cooperation communication (S603) again. When the RSRP of an anchor cell is less than the sum of an RSRP of the neighbor cell and the first cooperation threshold T1, the anchor cell and the neighbor cell perform the cooperation communication (S606), and may be changed to a level 2 state (S701). Hereinafter, a neighbor cell performing cooperation communication with the anchor cell refers to a supporting neighbor cell.

Next, in order to determine whether to be changed to a level 1 state to receive transmission by only anchor cell (S706), whether to substitute a supporting neighbor cell (S704), or whether to perform a handover procedure substituting the anchor cell (S703) in the level 2 state (S701), the UE collects RSRP information of a neighbor cell and may enter a corresponding mode according to a satisfied condition. Hereinafter, the level 2 state will be described in detail.

The base station may configure the cooperation-based cell cluster using the RSRP table at the level 2 state (S702). The RSRP table at the level 1 state includes only RSRP information of the anchor cell and the neighbor cell, and the RSRP table at the level 2 state may include RSRP information of a candidate anchor cell not neighboring the anchor cell but neighboring a supporting neighbor cell as well as the RSRP information of the anchor cell and the neighbor cell. This is for the purpose of easily performing the handover during performing the cooperation communication.

The base station may determine whether to perform the handover from the anchor cell to the candidate anchor cell (S703). When the RSRP of the candidate anchor cell is equal to or greater than a sum of the RSRP of the anchor cell and a handover threshold T2, the base station may perform the handover from the anchor cell to the candidate anchor cell (S709). In this case, the cooperation communication between the candidate anchor cell and the supporting neighbor cell may be maintained. After performing the handover to the candidate anchor cell, when the RSRP of the candidate anchor cell is equal to or greater than a sum of the RSRP of the supporting neighbor cell and a second cooperation threshold T4, the candidate anchor cell releases the cooperation communication and is operated in a single cell transmission mode (S708) and may be changed to the level 1 state (S601). When the RSRP of the candidate anchor cell is less than a sum of the RSRP of the neighbor cell and a second cooperation threshold T4, the anchor cell may maintain the cooperation communication with the supporting neighbor cell and reconfigure the cooperation-based cell cluster (S702).

When the RSRP of the candidate anchor cell is less than a sum of the RSRP of the anchor cell and a handover threshold T2, the handover to the candidate anchor cell does not occur and the anchor cell may determine whether to change the supporting neighbor cell (S704). When the RSRP of another neighbor cell neighboring the anchor cell is equal to or greater than a sum of the RSRP of the supporting neighbor cell and the substitute threshold T3, the cell performing the cooperation communication with the anchor cell may be changed from the neighbor cell to a new supporting neighbor cell (S705). When the RSRP of the neighbor cell neighboring the anchor cell is less than a sum of the RSRP of the supporting neighbor cell and the substitute threshold T3, the cooperation communication with the supporting neighbor cell may be maintained.

Next, the base station may determine whether to continue the cooperation communication between the anchor cell and the supporting neighbor cell (S706). When the RSRP of the anchor cell is equal to or greater than a sum of the RSRP of the supporting neighbor cell and a second cooperation threshold T4, the anchor cell is operated in a single cell transmission mode (S708) and may be changed to a level 1 state (S601). When the RSRP of the anchor cell is less than a sum of the RSRP of the supporting neighbor cell and the second cooperation threshold T4, the anchor cell maintains cooperation communication with the supporting neighbor cell and determines whether to change the cooperation-based cell cluster. When the cooperation-based cell cluster is changed, the cooperation-based cell cluster is reconfigured (S702). When the cooperation-based cell cluster is not changed, the base station may determine whether to perform the handover (S703).

FIG. 8 to FIG. 11 illustrates an example of a handover method using a cooperation-based cell cluster according to another embodiment of the present invention. In FIG. 8 to FIG. 11, the UE sequentially moves to zones of cells 1, 5, 4, and 10. It is assumed that the base station collects RSRP information of a neighbor cell and cells of zones outside the neighbor cell by UEs to include the RSRP information in an RSRP table. Accordingly, the base station may configure a cooperation-based cell cluster to perform cooperation communication and handover. In this case, the RSRP information in the RSRP table may be substituted by various information such as position information of UE and distance information between the base station and the UE or a combination thereof may be used.

Figure 8:
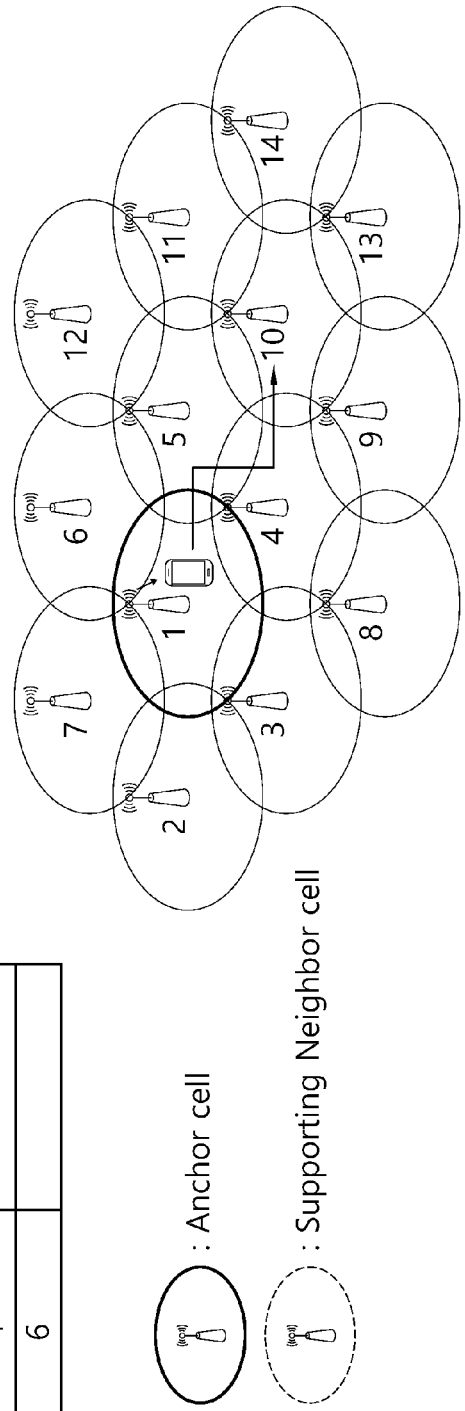
FIG. 8 to FIG. 11 illustrates an example of a handover method using a cooperation-based cell cluster according to another embodiment of the present invention.

In FIG. 8, the UE is located at a zone of cell 1. An anchor cell of the UE is cell 1, and the UE is a level 1 state to be served from only cell 1. Since the handover according to an embodiment of the present invention is possible in only the level 2 state, the RSRP table may include only information on a neighbor cell performing cooperation communication in the order of a RSRP size. In this case, since it is assumed that two cells perform cooperation communication, the cooperation-based cell cluster includes only two cells. That is, cell 5, which has the greatest RSRP among neighbor cells of cell 1 being an anchor cell currently serving the UE, is included in the cooperation-based cell cluster.

Figure 9:
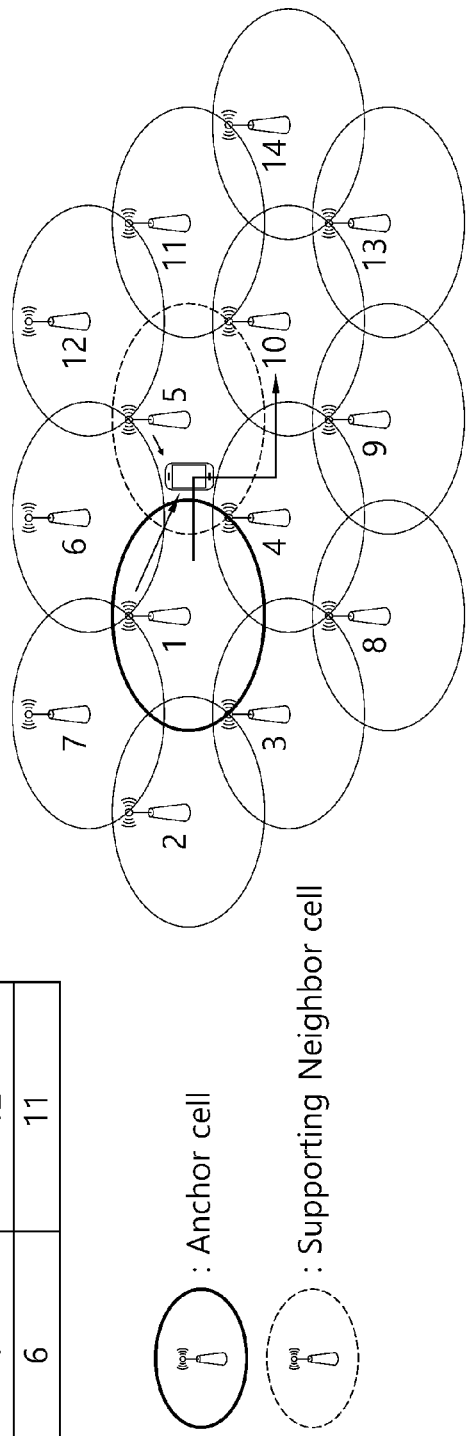

In FIG. 9, the UE moves to a zone of cell 5. An anchor cell of the UE still is cell 1. The UE is in a level 2 state served due to cooperation communication between cell 1 and cell 5 configuring the cooperation-based cell cluster. Since the handover according to an embodiment of the present invention is possible in the level 2 state, the RSRP table may include cells of external zones having possibility to perform handover as well as neighbor cells of cell 1. That is, the RSRP table includes cell 10, cell 12, and cell 11 being external candidate anchor cell as well as cell 5, cell 4, and cell 6 being the neighbor cells.

Figure 10:
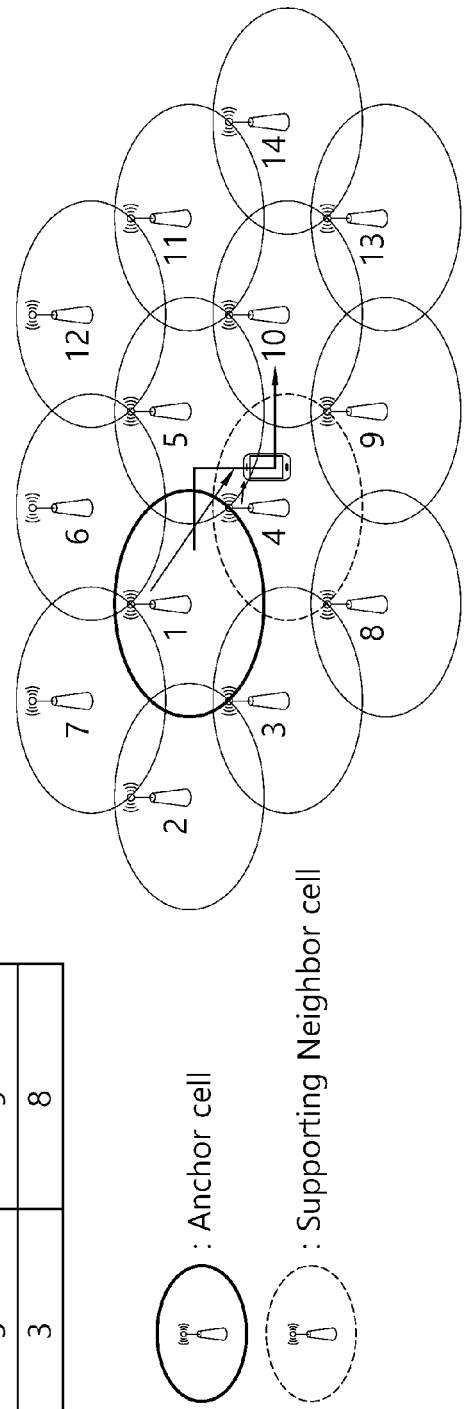

In FIG. 10, the UE moves to a zone of cell 4. An anchor cell of the UE still is cell 1. A supporting neighbor cell is substituted by cell 4 and maintains a level 2 state. The UE is served by cooperation communication between cell 1 and cell 4 configuring the cooperation-based cell cluster. Accordingly, a handover in which an anchor cell is substituted is not performed yet. The RSRP table includes cell 10, cell 9, and cell 8 being external candidate anchor cells as well as cell 4, cell 5, and cell 3 being the neighbor cells.

Figure 11:
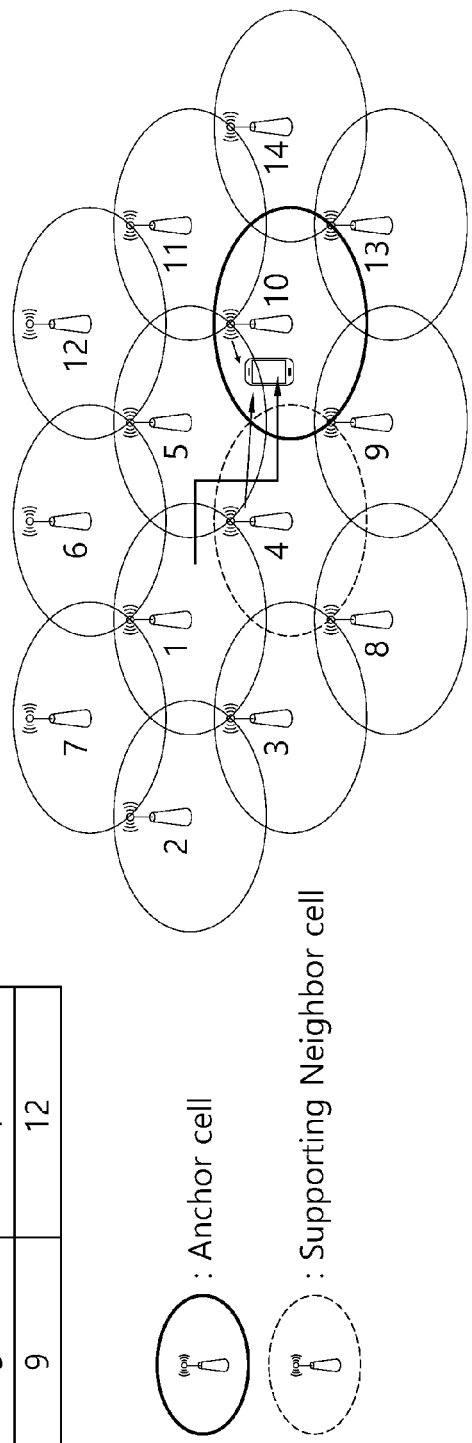

In FIG. 11, the UE moves to a zone of cell 10. In this case, the handover is performed, and cell 1 is substituted by cell 10 as the anchor cell. Since cooperation communication is performed by configuring the cooperation-based cell cluster with cell 10 being an anchor cell and cell 4 being an existing supporting neighbor cell simultaneously with performing the handover. The RSRP table includes cell 8, cell 1, and cell 12 being external candidate anchor cells as well as cell 4, cell 5, and cell 9 being the neighbor cells.

Finally, if the UE moves to a zone served from only cell 10, the state is changed to a level 1 state and the above remaining procedure may be performed.

Figure 12:
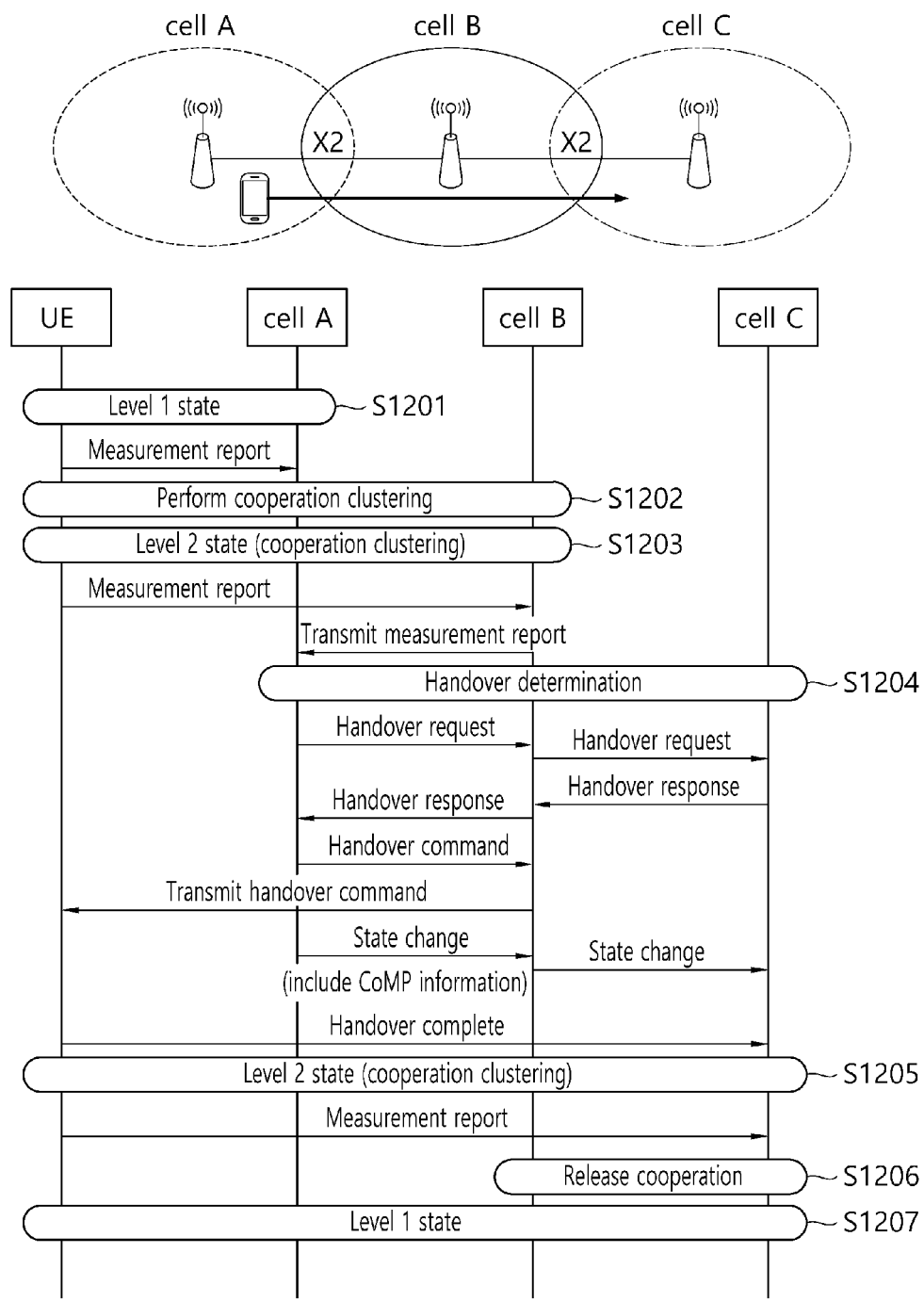
FIG. 12 illustrates an example of a handover signaling procedure of a handover method using the cooperation-based cell cluster according to an embodiment of the present invention.

FIG. 12 illustrates an example of a handover signaling procedure of a handover method using the cooperation-based cell cluster according to an embodiment of the present invention. Since it assumed that the cell is a small cell, cells are connected with neighboring cells through an X2 interface.

Referring to FIG. 12, the UE is served by using a cell A as an anchor cell and is in a level 1 state (S1201). If the UE measures signal strength of a neighbor cell to report the signal strength to the cell A, a base station of the cell A performs cooperation-based cell clustering (S1202). If a cooperation communication condition is satisfied, the cell A and the cell B is changed to a level 2 state to perform cooperation communication (S1203). If the UE measures signal strength of a neighbor cell in the level 2 state to report the signal strength to the cell B, the cell B transfers a measurement report to the cell A. If the UE moves from the cell B to a direction of a cell C to determine performing a handover from the cell A to the cell C (S1204), the handover from the cell A to the cell C is performed by performing procedures such as a handover request, a handover response, and a handover command, and the UE is maintained in a level 2 state where the cell C and the cell B perform cooperation communication (S1205). If the UE measures signal strength of a neighbor cell to report the signal strength to the cell C, and a cooperation communication release condition is satisfied so that the cell C determines releasing the cooperation communication (S1206), the UE is changed to a level 1 state and the cell C is operated in a single cell transmission mode (S1207). That is, according to the handover method according to an embodiment of the present invention, the UE sequentially move to a cell A, a cell B, and a cell C so that only a total one handover occurs. Accordingly, signaling overhead due to a handover to a core network is reduced.

Meanwhile, since the handover occurs when the UE is located at a supporting neighbor cell zone and a control signal for the handover is processed by the anchor cell, the supporting neighbor cell should receive the control signal for the handover from the anchor cell to transfer the control signal to the UE. However, since the UE does not access the supporting neighbor cell, the UE may not recognize a scrambling code of a control channel of the supporting neighbor cell. Accordingly, the supporting neighbor cell may not simply transfer the control signal for the handover to the UE. In order to solve the above problems, three solving schemes may be considered.

(1) The control signal for the handover may not be transmitted through a control channel of the supporting neighbor cell but may be transmitted through a specific data channel by allocating the specific data channel. To this end, an enhanced PDCCH (EPDCCH) suggested from a 3GPP LTE rel-11 may be used. However, in this case, utilization of the data channel is reduced.

(2) Control channel information of an anchor cell may be copied to a control channel of the supporting neighbor cell and the control signal for the handover may be periodically transmitted through a control channel of the supporting neighbor cell. During a corresponding period to copy and transmit the control channel information of the anchor cell, a control signal for UE directly accessing the supporting neighbor cell to be served from the supporting neighbor cell may not be transmitted. However, since a resource for data and control information is sufficient in a small cell congestion environment, both of two schemes is determined to be applicable.

Figure 13:
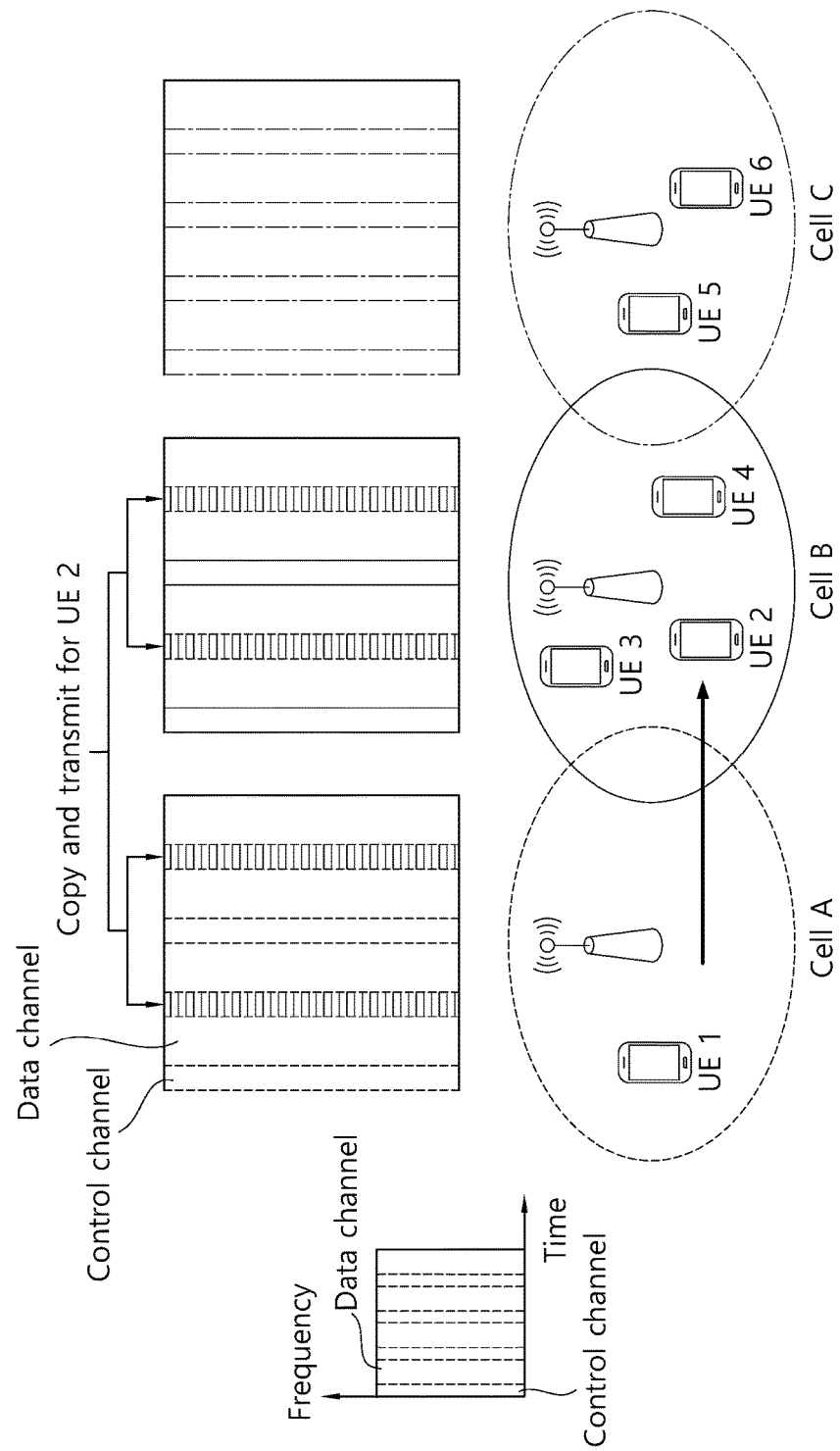
FIG. 13 illustrates an example of a scheme which copies control channel information of an anchor cell in a control channel of a supporting neighbor cell to periodically transmit the copied control channel.

FIG. 13 illustrates an example of a scheme which copies control channel information of an anchor cell in a control channel of a supporting neighbor cell to periodically transmit the copied control channel. In FIG. 13, if the UE moves from the cell A to the cell B, the UE copies the control channel information of the cell A in a control channel of the cell B to periodically transmit the copied control channel.

Figure 14:
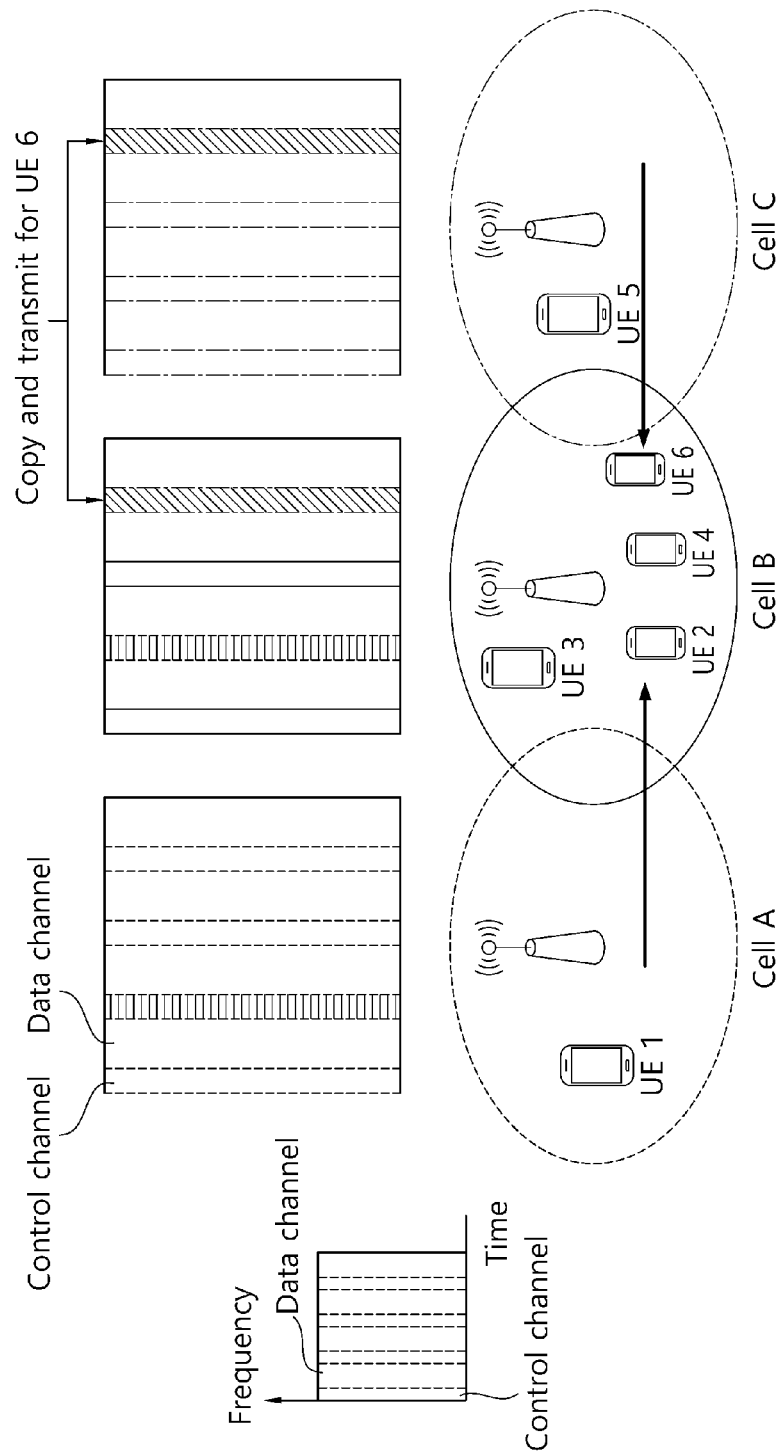
FIG. 14 illustrates another example of a scheme which copies control channel information of an anchor cell in a control channel of a supporting neighbor cell to periodically transmit the copied control channel.

FIG. 14 illustrates another example of a scheme which copies control channel information of an anchor cell in a control channel of a supporting neighbor cell to periodically transmit the copied control channel. In FIG. 14, if the UE 2 moves from the cell A to the cell B, the UE 2 copies the control channel information of the cell A in a control channel of the cell B to periodically transmit the copied control channel. Further, if the UE 6 moves from the cell C to the cell B, the UE 6 copies the control channel information of the cell C in a control channel of the cell B to periodically transmit the copied control channel.

(3) A control signal for a handover may be transmitted using multi antennas. That is, the control signal for a handover may be transmitted by separating UEs accessing the present cell as an anchor cell and UEs accessing the present cell as a supporting neighbor cell by antennas.

Figure 15:
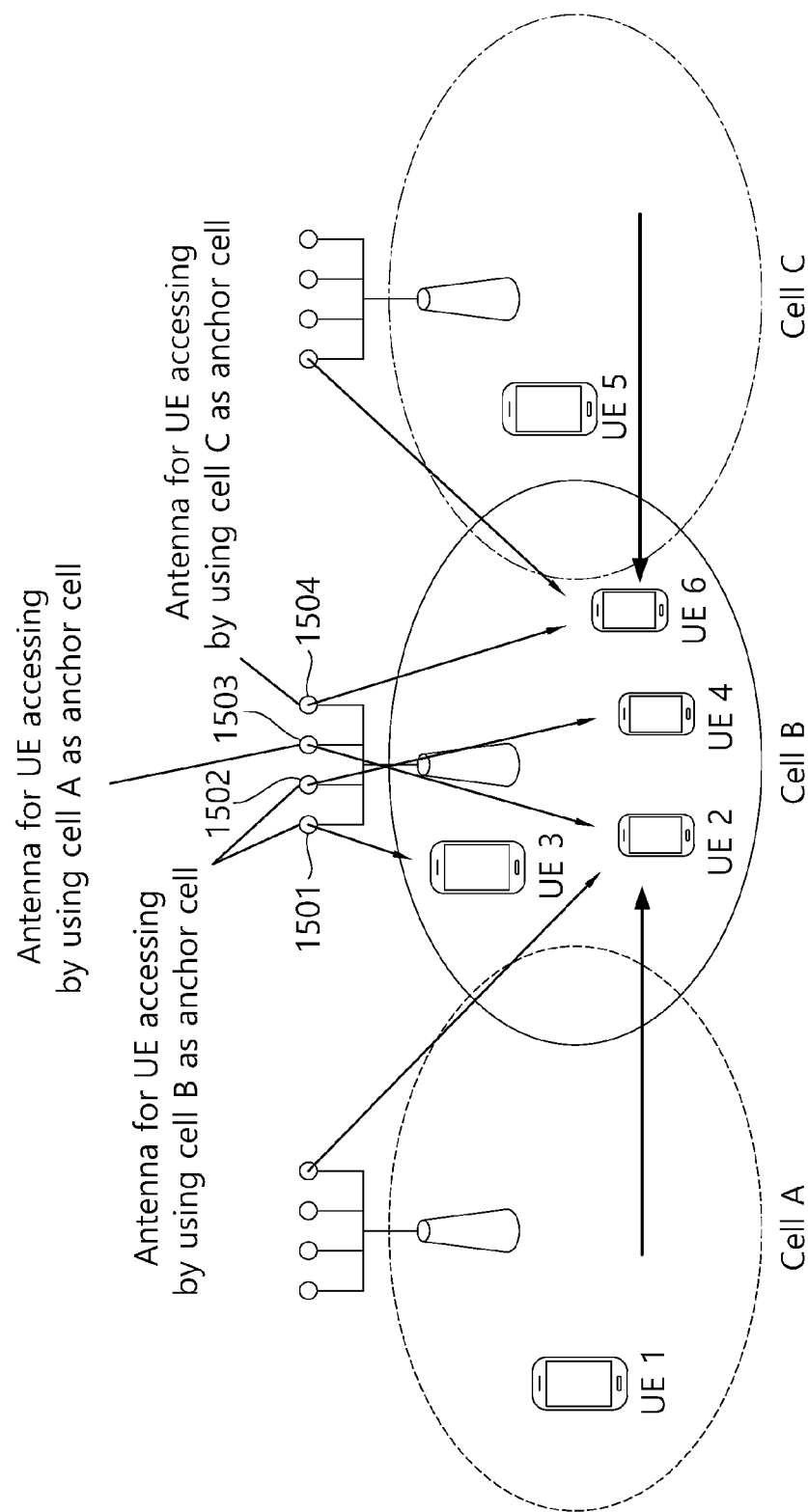
FIG. 15 illustrates an example of a scheme for transmitting a control signal for a handover using multi antennas according to an embodiment of the present invention.

FIG. 15 illustrates an example of a scheme for transmitting a control signal for a handover using multi antennas according to an embodiment of the present invention. A control signal may be transmitted to UEs 3 and 4 accessing the present cell as an anchor cell through antennas 1501 and 1502. A control signal may be transmitted to UEs 2 and 6 accessing the present cell as an anchor cell through antennas 1503 and 1504.

The following is a difference between an existing handover method and a handover method according to an embodiment of the present invention. First, in a base station aspect, when UE moves having a predetermined directionality, the number of handover may be reduced by half or less according to a moving pattern of the UE.

Figure 16:
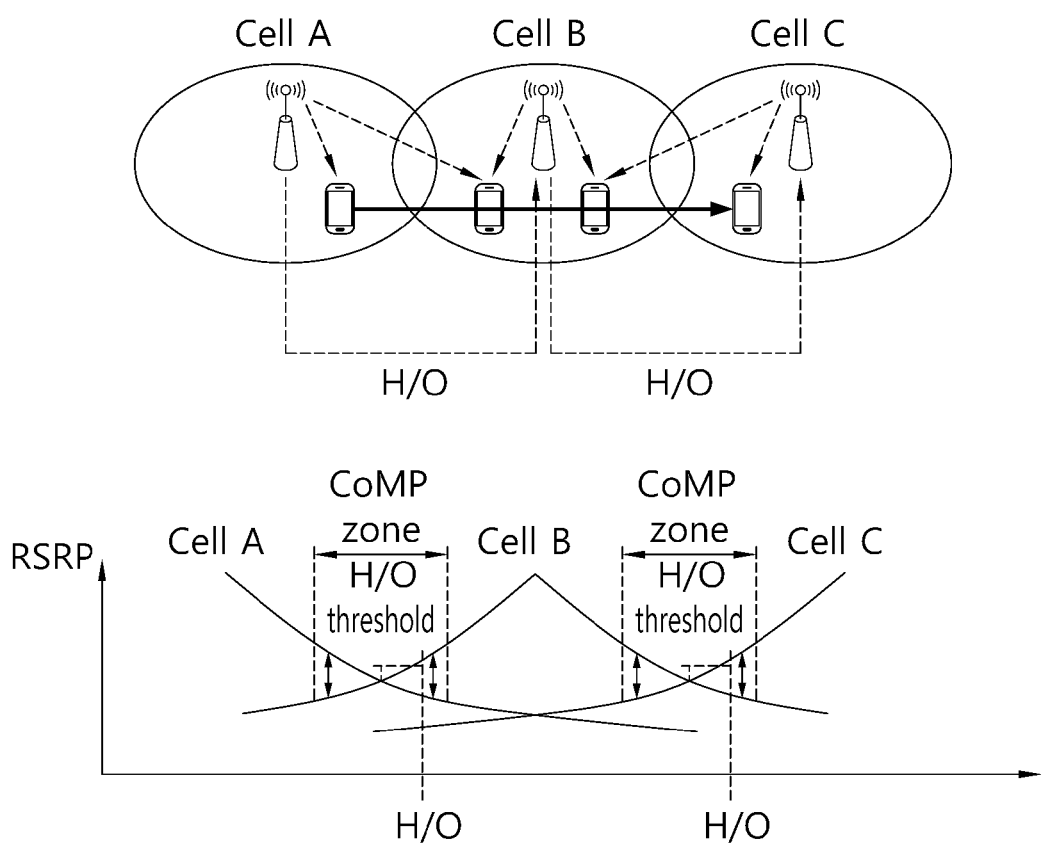
FIG. 16 illustrates a handover method according to the related art.

FIG. 16 illustrates a handover method according to the related art. When the UE sequentially moves to a cell A, a cell B, and a cell C, the UE should perform two handovers. Further, the handover may be always performed in a coordinated multipoint (CoMP) zone. That is, the handover occurs between cells performing the cooperation communication.

Figure 17:
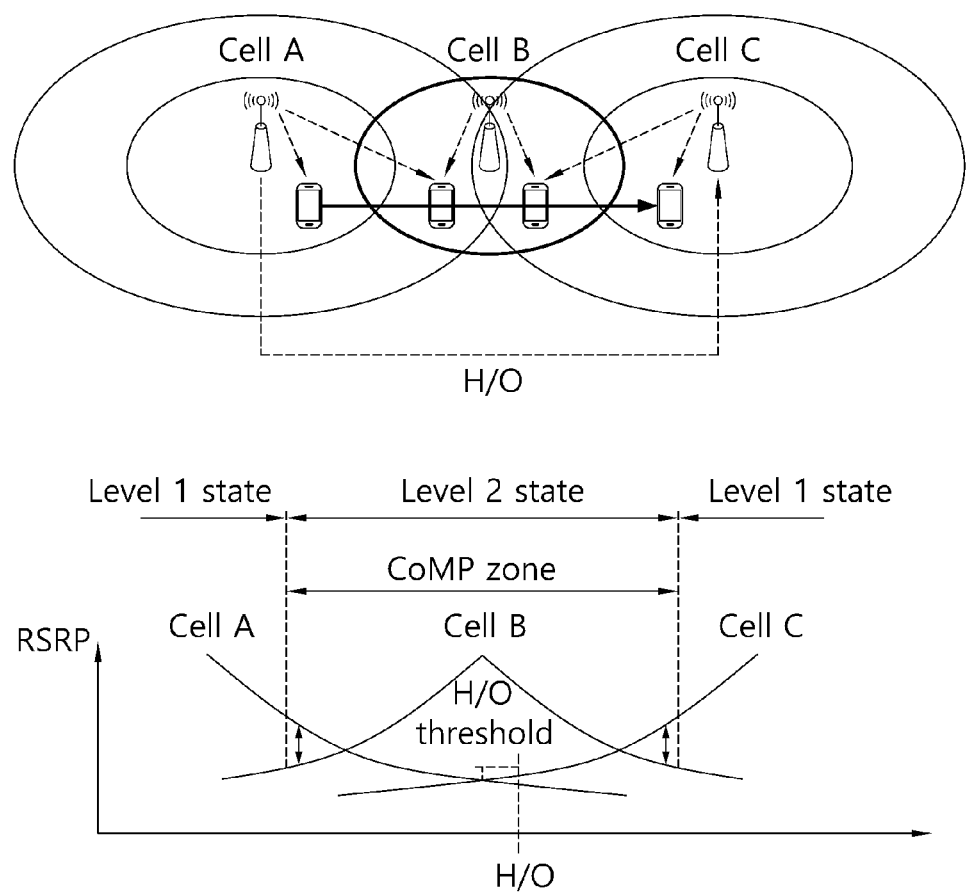
FIG. 17 illustrates a handover method according to an embodiment of the present invention.

FIG. 17 illustrates a handover method according to an embodiment of the present invention. When the UE sequentially moves to a cell A, a cell B, and a cell C, the UE should always perform one handover. That is, the handover is performed to a cell different from a cell performing the cooperation communication. To this end, two level states of the UE and the base station and a newly configured handover signaling procedure described above may be defined.

Meanwhile, an operation of the UE may be changed according to a level state of the UE in a UE aspect. That is, the number of cells considering the RSRP may be changed according to a level state of the UE.

Figure 18:
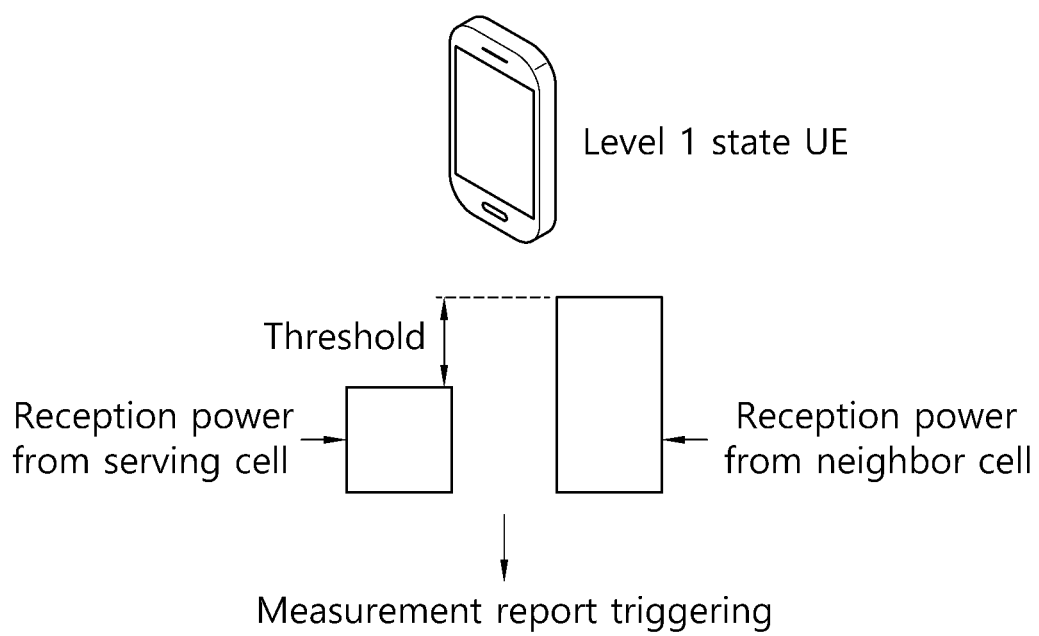
FIG. 18 illustrates an operation of a UE at a level 1 state according to an embodiment of the present invention.

FIG. 18 illustrates an operation of a UE at a level 1 state according to an embodiment of the present invention. The UE at a level 1 state may trigger a measurement report according to a preset threshold value by monitoring an RSRP of a neighbor cell cooperating with an anchor cell to be currently served.

Figure 19:
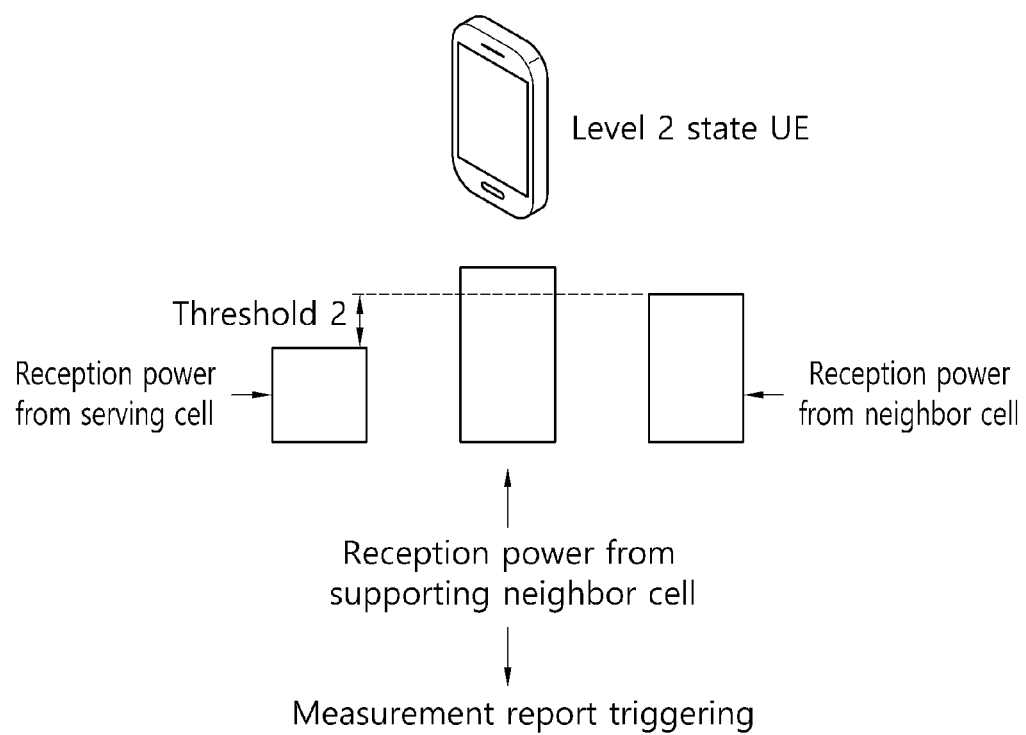
FIG. 19 illustrates an operation of the UE at a level 2 state according to an embodiment of the present invention

FIG. 19 illustrates an operation of the UE at a level 2 state according to an embodiment of the present invention. The UE at a level 2 state is simultaneously served from the anchor cell and the supporting neighbor cell through cooperation communication. The UE may trigger a measurement report according to a preset threshold value with respect to the anchor cell and a neighbor cell located at an external zone by monitoring an RSRP of an anchor cell, an RSRP of a supporting neighbor cell, and an RSRP of a neighbor cell located at an external zone.

Meanwhile, although the foregoing embodiment has described a method for receiving a control signal for a handover of an anchor cell from the supporting neighbor cell by the UE in a base station side, there may be a need for an additional operation in a UE side. When it is assumed that control channel information of an anchor cell is copied in a control channel of a supporting neighbor cell to be periodically transmitted, a reference signal is transmitted as a specific reference signal of the supporting neighbor cell. Accordingly, the UE needs to receive a control signal from a cell corresponding to the specific reference signal of the supporting neighbor cell. Since the UE may receive the reference signal without accessing the cell, in order to receive data without accessing the supporting neighbor cell, when a reference signal having a RSRP greater than a specific threshold is transmitted, the reference signal may be set so that UE may attempt decoding of a control channel and data of a corresponding cell.

Figure 20:
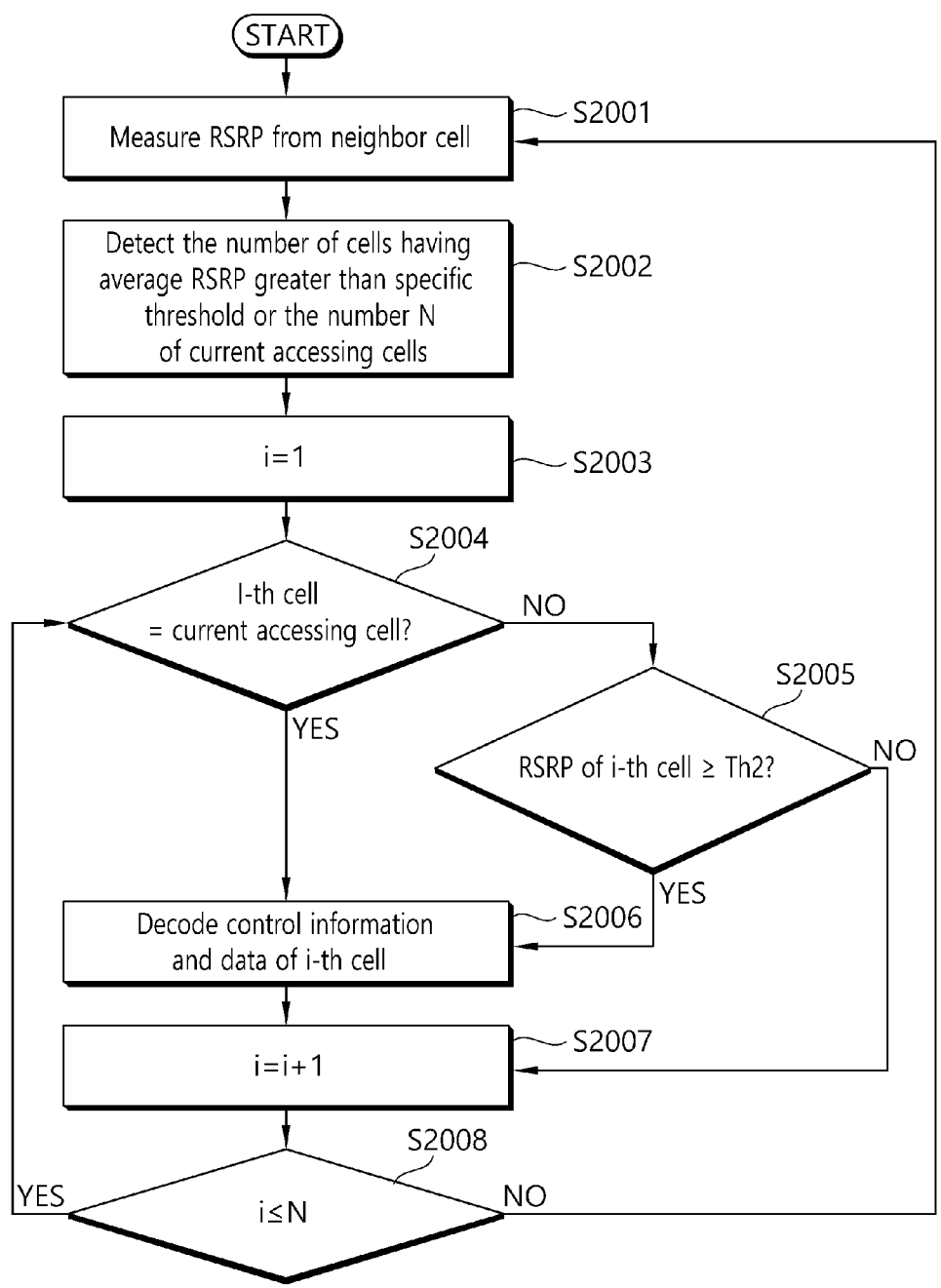
FIG. 20 illustrates an example of a method for determining whether the UE decodes a control channel according to an embodiment of the present invention.

FIG. 20 illustrates an example of a method for determining whether the UE decodes a control channel according to an embodiment of the present invention. First, the UE measures an RSRP from a neighbor cell (S2001). The UE may detect the number of cells having an average RSRP greater than a specific threshold or the number N of current accessing cells to distinguish the cells from the current accessing cells (S2002). The UE sets an initial value as i=1 (S2003), and increases i one by one to determine whether to decode control information and data with respect to N cells. In detail, if an i-th cell is a current accessing cell (S2004), the UE may decode control information and data of the i-th cell (S2006). If the i-th cell is not the current accessing cell, when an RSRP of a corresponding cell is equal to or greater than a specific threshold (S2005), the UE may decode control information and data of the i-th cell (S2006). Through the above procedure, the UE may receive the control information and data without accessing the supporting neighbor cell.

Hereinafter, a method for receiving a control channel according to an embodiment of the present invention is described. As described above, when performing a handover method through a cooperation-based cell cluster according to an embodiment of the present invention, there is a need to discuss a method for receiving the control channel by the UE in order to support a seamless handover. For example, the UE may have an anchor cell of physical cell ID (PCID)=1. The UE may have at least one supporting neighbor cell of PCID=2, 3. Further, the UE may have a neighbor cell for handover of PCID=4. When the UE is located at a zone in which coverage of an anchor cell of PCID=1 overlaps with coverage of a supporting neighbor cell of PCID=2, the UE may receive a RS from the anchor cell and the supporting neighbor cell through different scrambling IDs. In order to receive a control signal and data from a plurality of cells or from the supporting neighbor cell when the UE moves to the supporting neighbor cell, following schemes may be considered according to an embodiment of the present invention.

(1) Blinding Coding a Plurality of CRSs/(E)PDCCHs

When the UE is located at a zone in which coverage of an anchor cell overlaps with coverage of a supporting neighbor cell, the UE may receive a cell-specific RS (CRS) with a suitable accuracy from both the anchor cell and the supporting neighbor cell. Accordingly, it may be assumed that the UE may receive an (E)PDCCH from both the anchor cell and the supporting neighbor cell. It may be determined which one of the anchor cell and the supporting neighbor cell transmits the (E)PDCCH thereto by attempting decoding the (E)PDCCH received from the anchor cell and the supporting neighbor cell. In this case, if only one cell transmits the (E)PDCCH, the UE may detect only one (E)PDCCH. Although a PDCCH is received from the supporting neighbor cell, the PDCCH may be scrambled based on an ID of the anchor cell. The EPDCCH may be scrambled based on a UE ID. In order to exactly resource mapping, there is a demand to consider an ID of each cell.

For example, it may be assumed that a start symbol of a physical downlink shard channel (PDSCH) is the same as a start symbol of a PDSCH of the anchor cell with respect to a physical control format indicator channel (PCFICH). Accordingly, the UE does not need to read a PCFICH of a neighbor cell. Alternatively, the UE may read a PCFICH of the supporting neighbor cell. Since reception quality of the UE located at a boundary of the anchor cell may not be excellent, although the PCFICH of the anchor cell is decoded, the reception quality may be insufficient. Accordingly, an inter-cell interference coordination (ICIC) technology of some extent should be considered. For example, in order to improve the quality of the PCFICH of the anchor cell, the supporting neighbor cell may perform muting in a resource element (RE) for the PCFICH of the anchor cell.

With respect to a physical HARQ indicator channel (PHICH), a PHICH configuration may be assumed as the same in all cells performing cooperation communication. Accordingly, the UE may assume resource mapping without reading a physical broadcast channel (PBCH) of the supporting neighbor cell. If a position of an RE for the CRS and RE mapping of a PDCCH or a control channel element (CCE) is determined based on a cell ID, the UE may search a cell-specific search space (CSS) and/or a UE-specific search space (USS) of two cells on the assumption that the two cells may transmit the (E)PDCCH.

In order to allow simultaneous transmission of a potential (E)PDCCH from the two cells, the two cells may control an (E)PDCCH or CCE resource to prevent overlapping with respect to a specific UE.

(2) Explicit Signaling to Indicate which Cell Transmits a Control Signal and Data to the UE The explicit signaling may indicate which cell transmits the control signal and/or data to a specific UE at a specific time. As one approach, a cell group is configured through a RRC configuration, and one cell may be activated through a MAC control element (CE). The above is similar to configuring a plurality of secondary cells (SCell). However, the above is different from SCell activation/inactivation procedure in that the UE should change a primary cell (PCell) if a cell is activated. Since the UE exactly knows cell information, the UE may decode a necessary control signal and/or data based on the known cell information.

(3) PDCCH Transmission Copy

According to PDCCH transmission copy, redundant PDCCH transmission may be allowed from an anchor cell and a supporting neighbor cell. In order to minimize influence upon the UE served from the supporting neighbor cell, it may be considered to transmit the PDCCH using different resources.

Figure 21:
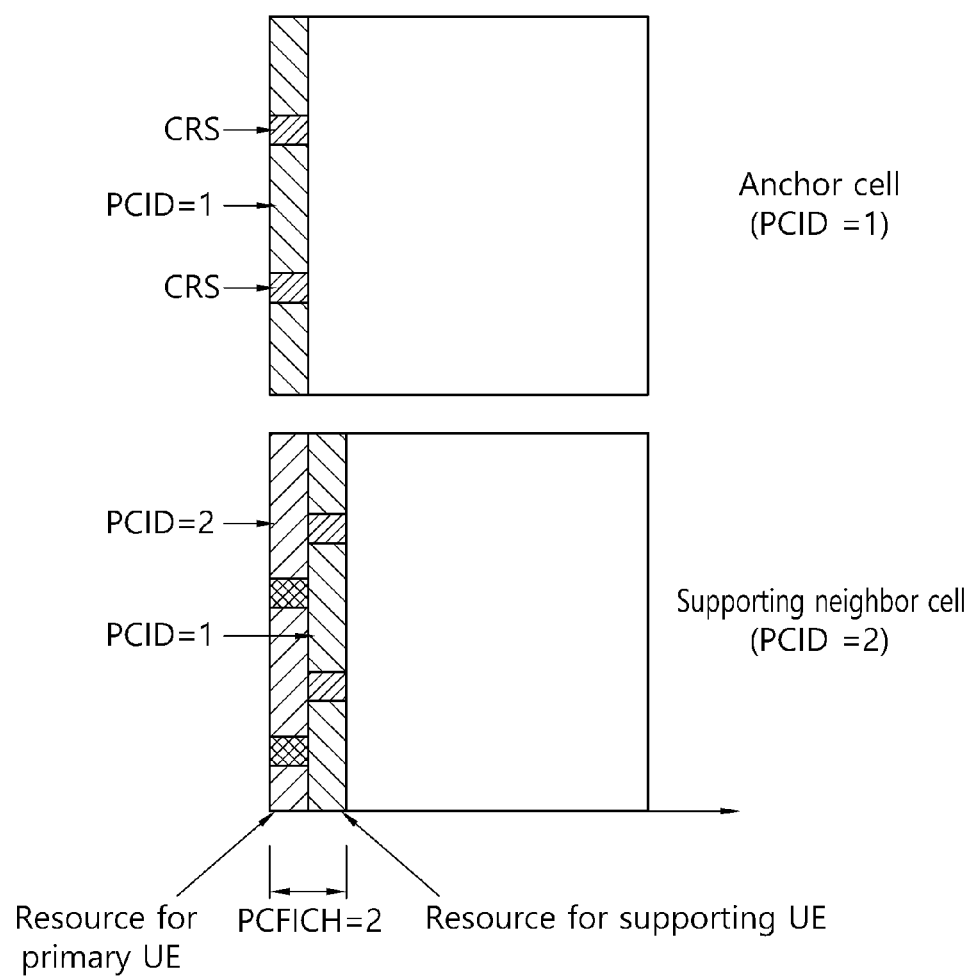
FIG. 21 illustrates an example of a control channel configuration according to an embodiment of the present invention.

FIG. 21 illustrates an example of a control channel configuration according to an embodiment of the present invention. The UE may attempt to read a CRS transmitted from an anchor cell in a first OFDM symbol (and a fourth OFDM symbol if a subframe is not a multicast broadcast single frequency network (MBSFN) subframe). Further, the UE may attempt to read a CRS received from a supporting neighbor cell in a second OFDM symbol. In order to prevent interference to other signals transmitted from the supporting neighbor cell for the UE served by using the supporting neighbor cell as a serving cell, it may be assumed that the supporting neighbor cell transmits a CRS for the anchor cell in only one OFDM symbol (first OFDM symbol). However, the present invention is not limited thereto. That is, the above is applicable to another OFDM symbol.

The supporting neighbor cell sets the number of OFDM symbols used for a PDCCH including a PDCCH region used for the anchor cell. In an actual PDCCH transmission aspect, it may be considered that each OFDM symbol transmits a PDCCH for a primary UE or a supporting UE or different PDCCHs for the primary UE and the supporting UE are multiplexed. In order to minimize scheduling complexity, a PCFICH for the primary UE may be set to 1. For the supporting UE, it may be assumed that a PDCCH is transmitted from a second OFDM symbol without the PCFICH. Since a PDSCH for the primary UE cannot be started from the second OFDM symbol, a start OFDM symbol may be configured through a higher layer signaling or a PDSCH overlapping with a PDCCH for the supporting UE may be punctured. One drawback of the above method is that 4 port CRS transmission is not allowed because a first OFDM symbol is used for the anchor cell.

In general, each cell of a network may transmit a CRS and a PDCCH thereof for the primary UE in the first OFDM symbol, and may transmit a CRS and a PDCCH for a supporting UE supported by a virtual cell in the second OFDM symbol. The CRS and the PDCCH for the supporting UE may be scrambled by a virtual cell ID. The supporting UE supported by the virtual cell may perform radio resource management (RRM) and substantial time/frequency tracking using only a CRS based on a virtual cell ID. A plurality of cell shares the virtual cell ID so that the UE may detect the CRS with a higher signal-to-interference-plus-noise ratio (SINR) (through single frequency network (SFN) transmission). In order to prevent increase of the UE complexity, it may be additionally considered to limit the number of cell IDs (or scrambling IDs) to be used for a CRS of a virtual cell. Radio link management (RLM) may be achieved based on a CRS scrambled by a virtual cell ID. In order to prevent limitation of the number of OFDM symbols to be used for a PDCCH for the primary UE, it may be considered that the CRS scrambled by the virtual cell ID is transmitted in a third OFDM symbol instead of the second OFDM symbol. However, the above may limit to apply the virtual cell transmission to a non-MBSFN subframe, and may exert influence upon the whole performance. Insufficient PDCCH for the primary UE may be dealt with an EPDCCH and cross carrier scheduling as necessary.

When the number of UEs is not great in a small cell, it may be considered to limit the number of OFDM symbol for the PDCCH as one. The PDCCH transmitted based on the virtual cell ID may be transferred with respect to system information (may be common with respect to participating cell/transmission point (TP)), and necessary information for a virtual cell configuration may be also transferred.

Figure 22:
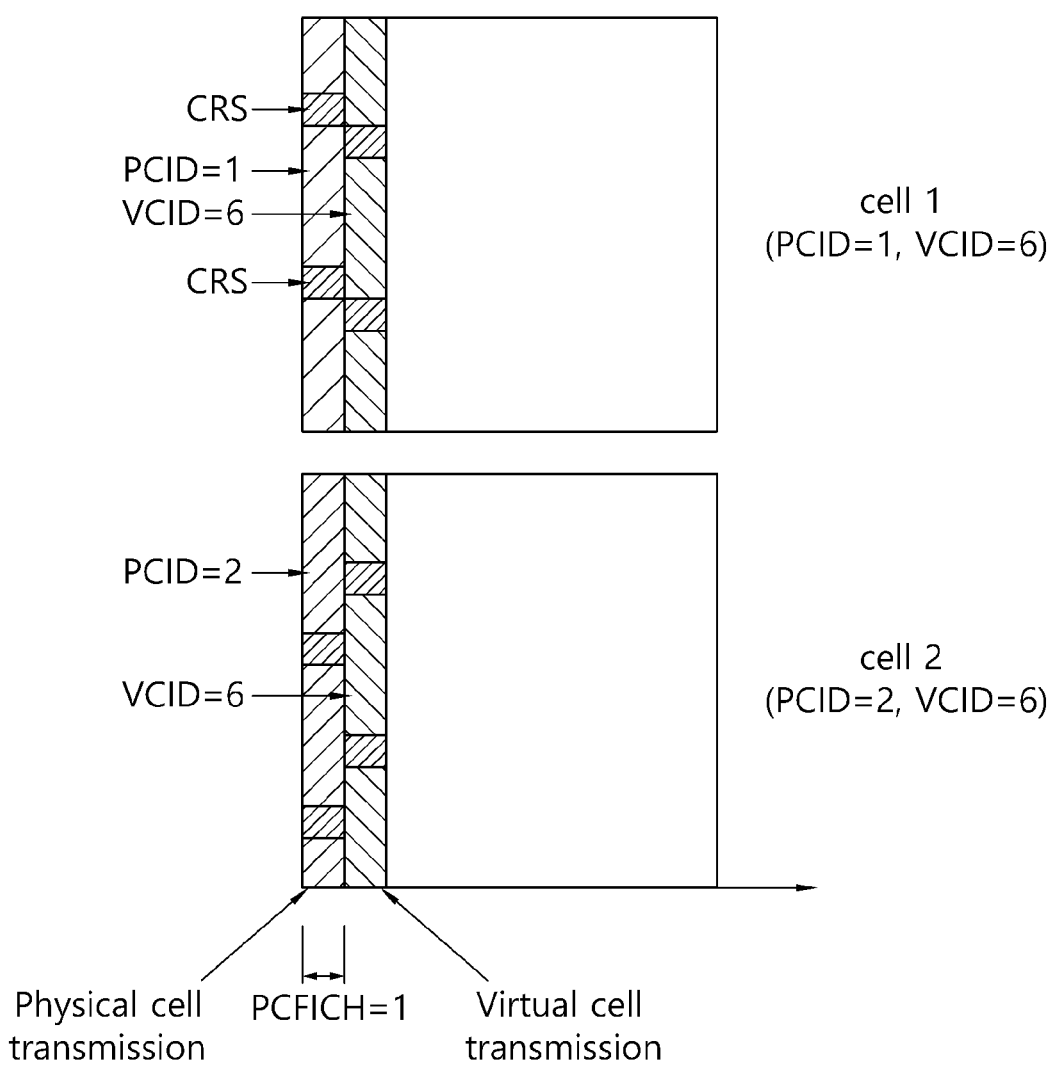
FIG. 22 illustrates another example of a control channel configuration according to an embodiment of the present invention.

FIG. 22 illustrates another example of a control channel configuration according to an embodiment of the present invention. Referring to FIG. 22, in a cell 2 of PCID=2 and virtual cell ID (VCID)=6, the number of OFDM symbol for a PDCCH for physical cell transmission is 1. That is, PDCCH/CRS is transmitted in the first OFDM symbol based on a physical cell ID. Further, PDCCH/CRS is transmitted in the second OFDM symbol based on the virtual cell ID.

When there is a need to minimize influence upon an existing UE, a region of the virtual CRS/PDCCH may be limited to several physical resource blocks (PRBs) (e.g. middle 6 PRB).

In summary, according to PDCCH transmission copy, separate PDCCH/CRS may be transmitted from the supporting neighbor cell for an anchor cell (or virtual cell) and a physical cell. In a data transmission aspect, data scheduled by the anchor cell (or virtual cell) may be transmitted based on a virtual cell ID or an anchor cell ID, and data scheduled by the physical cell may be transmitted based on a physical cell ID.

Hereinafter, a method for transmitting a hybrid automatic repeat request (HARQ)-acknowledgement (ACK) according to an embodiment of the present invention will be described. When the UE handovers from an anchor cell to a neighbor cell (regardless of actual handover or virtual handover), the UE needs to transmit HARQ-ACK in aspects such as a resource and/or physical uplink control channel (PUCCH) format differently from an existing method.

As one method, the HARQ-ACK may be transmitted by using the same configuration as that of the anchor cell in the handover neighbor cell. In this case, a scrambling ID based on the anchor cell may be used. As another method, an explicit PUCCH resource may be configured for the supporting neighbor cell transmitting the PDSCH. That is, the HARQ-ACK with respect to the PDSCH transmitted from the supporting neighbor cell may be transmitted using an explicitly configured PUCCH resource. In this case, similar to the PUCCH format 3 resource, at least one PUCCH resource may be configured and may be dynamically selected through downlink control information (DCI).

When the UE receives data from both of the anchor cell and the supporting neighbor cell (time division duplex (TDD) or carrier aggregation (CA) situation), how to transmit HARQ-ACK may cause a problem. As one method, regardless of which cell transmits data, HARQ-ACK multiplexing is allowed and the HARQ-ACK may be transmitted based on a configuration of the anchor cell. As another method, HARQ-ACK multiplexing may not be allowed on the assumption that the UE does not expect receiving unicast data from different cells in a given subframe. In this case, the given subframe may correspond to one PUCCH in a TDD, may be mapped to one PUCCH timing or may correspond to a different carrier in a CA. In addition, there is a need to transmit the HARQ-ACK of the UE through a single uplink channel such as a PUCCH or a PUSCH including the HARQ-ACK.

Alternatively, when concepts of a physical cell and a virtual cell are used, an HARQ-ACK for the physical cell may depend on an existing procedure and an HARQ-ACK for the virtual cell may be depend on the explicitly configured HARQ-ACK resource. The UE is not expected to simultaneously decode the PDSCH transmitted from the physical cell and the PDSCH transmitted from the virtual cell. That is, in a cell aspect, only one PDSCH may be transmitted to a given UE. Further, it may not be expected that the UE receives simultaneously a unicast PDSCH from the physical cell and a unicast PDSCH from the virtual cell in given subframe/frequency. In this case, the UE may apply a high priority to the PDSCH from the virtual cell. Accordingly, the PDSCH from the physical cell may be omitted/disregarded and vice versa. In this case, a HARQ-ACK bit corresponding to the PDSCH from the physical cell and the PDSCH from the virtual cell may be multiplexed. Alternatively, the HARQ-ACK for the virtual cell may be periodically transmitted independently from HARQ transmission for the physical cell (for example, the HARQ-ACK is transmitted from a first or second subframe every radio frame). In this case, in a subframe in which the HARQ-ACK for the virtual cell is scheduled, the HARQ-ACK for the physical cell may not be transmitted. Alternatively, it is assumed that there is no unicast PDSCH transmitted from the virtual cell. Accordingly, there may not be a need for the HARQ-ACK for the virtual cell.

When the HARQ-ACK for the virtual cell is transmitted, in a scrambling ID and resource configuration aspect, the HARQ-ACK for the virtual cell may depend on a configuration of the physical cell (when there is an associated serving cell) or a configuration of the virtual cell. Since there is consistency regardless of change of an actual serving cell or the physical cell, it may be preferable to use the configuration of the virtual cell.

Meanwhile, when the UE may connect with the virtual cell to receive data from the physical cell, an RRC reconfiguration message may be received from the physical cell. In this case, unless defined otherwise, the same configuration is applicable to all physical cells included in the virtual cell. That is, an RRC configuration may be performed at a virtual cell level through all physical cells included in the virtual cell.

Figure 23:
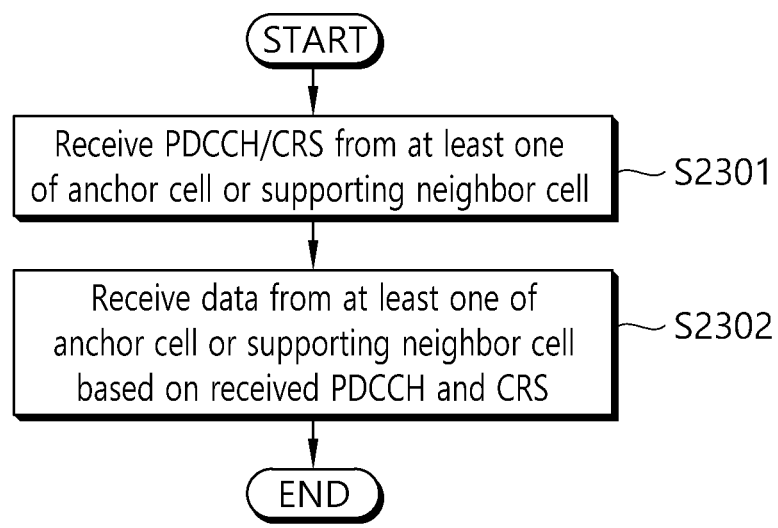
FIG. 23 illustrates an example of a method for receiving a control channel according to an embodiment of the present invention.

FIG. 23 illustrates an example of a method for receiving a control channel according to an embodiment of the present invention. At step S2301, a UE receives PDCCH/CRS from at least one of an anchor cell or a supporting neighbor cell. At step S2302, the UE receives data from at least one of the anchor cell or the supporting neighbor cell based on the received PDCCH and CRS. The PDCCH and CRS may be received from both the anchor cell and the supporting neighbor cell. The PDCCH may be scrambled based on an ID of the anchor cell. The UE may receive an indicator to indicate which one of the anchor cell or the supporting neighbor cell transmits the PDCCH and the CRS. The indicator may be a MAC CE to activate the anchor cell or the supporting neighbor cell in a previously configured cell group. The PDCCH of the anchor cell and the PDCCH of the supporting neighbor cell may use different resources. The PDCCH of the supporting neighbor cell may be transmitted in a first OFDM symbol. The PDCCH of the anchor cell may be transmitted in a second OFDM symbol. The PDCCH of the anchor cell may be transmitted using only a specific number of PRBs. Data may be transmitted from the anchor cell based on an anchor cell ID. Data may be transmitted from the supporting neighbor cell based on a supporting neighbor cell ID.

Figure 24:
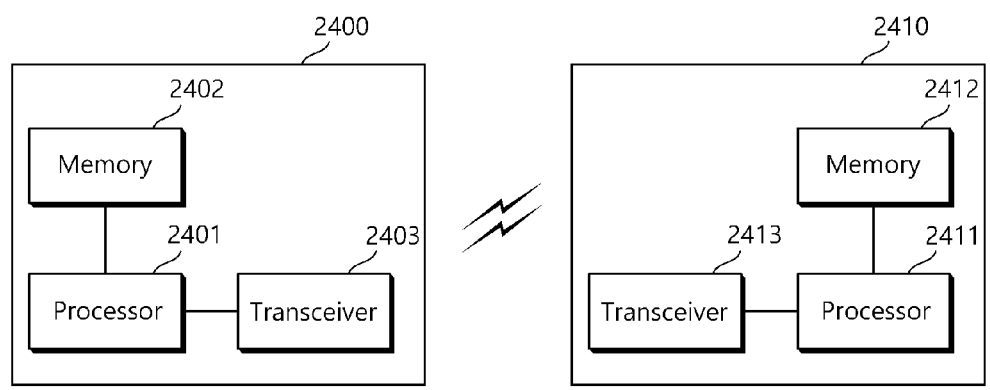
FIG. 24 is a block diagram illustrating a wireless communication system according to the embodiment of the present invention.

FIG. 24 is a block diagram illustrating a wireless communication system according to the embodiment of the present invention.

A BS 2400 includes a processor 2401, a memory 2402 and a transceiver 2403. The memory 2402 is connected to the processor 2401, and stores various information for driving the processor 2401. The transceiver 2403 is connected to the processor 2401, and transmits and/or receives radio signals. The processor 2401 implements proposed functions, processes and/or methods. In the above embodiment, an operation of the base station may be implemented by the processor 2401.

A UE 2410 includes a processor 2411, a memory 2412 and a transceiver 2413. The memory 2412 is connected to the processor 2411, and stores various information for driving the processor 2411. The transceiver 2413 is connected to the processor 2411, and transmits and/or receives radio signals. The processor 2411 implements proposed functions, processes and/or methods. In the above embodiment, an operation of the base station may be implemented by the processor 2411.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for receiving a control channel by a user equipment (UE) in a wireless communication system, the method comprising:

receiving, from an anchor cell, a physical downlink control channel (PDCCH) of the anchor cell and a cell-specific reference-signal (CRS) of the anchor cell, in a first orthogonal frequency division multiplexing (OFDM) symbol;

receiving, from a supporting neighbor cell, the PDCCH of the anchor cell and a CRS of the supporting neighbor cell, in a second OFDM symbol; and receiving data from at least one of the anchor cell or the supporting neighbor cell on the basis of the received PDCCHs and CRSs, wherein the PDCCH of the anchor cell is copied from the anchor cell to the supporting neighbor cell, wherein the anchor cell is a cell currently serving the UE, wherein the supporting neighbor cell is a cell having a highest signal strength among at least one neighboring cell, and wherein the at least one neighboring cell is at least one cell adjacent to the anchor cell.

2. The method of claim 1, wherein the PDCCH is scrambled based on an identifier (ID) of the anchor cell.

3. The method of claim 1, wherein the PDCCH of the anchor cell is transmitted by using only a specific number of physical resource blocks (PRBs).

4. The method of claim 1, wherein the data is transmitted from the anchor cell based on an ID of the anchor cell.

5. The method of claim 1, wherein the data is transmitted from the supporting neighbor cell based On an In of the supporting neighbor cell.

6. A user equipment (UE) comprising:

a memory;

a transceiver; and a processor, connected to the memory and the transceiver, that:

controls the transceiver to receive, from anchor cell, a physical downlink control channel (PDCCH) of the anchor cell and a cell-specific reference-signal (CRS) of the anchor cell, in a first orthogonal frequency division multiplexing (OFDM) symbol;

controls the transceiver to receive from a supporting neighbor cell, the PDCCH of the anchor cell and a CRS of the supporting neighbor cell, in a second OFDM symbol; and controls the transceiver to receive data from at least one of the anchor cell or the supporting neighbor cell on the basis of the received PDCCHs and CRSs, wherein the PDCCH of the anchor cell is copied from the anchor cell to the supporting neighbor cell, wherein the anchor cell is a cell currently serving the UE, wherein the supporting neighbor cell is a cell having a highest signal strength among at least one neighboring cell, and wherein the at least one neighboring cell is at least one cell adjacent to the anchor cell.

\* \* \* \* \*